(12) United States Patent
Edanami

(10) Patent No.: US 6,996,275 B2
(45) Date of Patent: Feb. 7, 2006

(54) IMAGE CONTROL APPARATUS

(75) Inventor: Takafumi Edanami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 810 days.

(21) Appl. No.: 10/102,816

(22) Filed: Mar. 22, 2002

(65) Prior Publication Data

US 2003/0076997 A1 Apr. 24, 2003

(30) Foreign Application Priority Data

Sep. 10, 2001 (JP) ............................. 2001-273189

(51) Int. Cl.
*G06K 9/68* (2006.01)

(52) U.S. Cl. ...................... 382/218; 340/541; 348/152; 382/103; 382/305

(58) Field of Classification Search ................ 340/541; 348/143, 152; 382/103, 217, 305
See application file for complete search history.

(56) References Cited

U.S. PATENT DOCUMENTS

| | | | | |
|---|---|---|---|---|
| 6,069,655 | A * | 5/2000 | Seeley et al. ................ 348/154 |
| 6,442,474 | B1 * | 8/2002 | Trajkovic et al. ........... 701/117 |
| 6,646,676 | B1 * | 11/2003 | DaGraca et al. ............ 348/155 |
| 6,741,977 | B1 * | 5/2004 | Nagaya et al. ................. 707/1 |
| 6,757,008 | B1 * | 6/2004 | Smith ........................ 348/143 |
| 6,812,835 | B2 * | 11/2004 | Ito et al. ..................... 340/541 |
| 6,841,780 | B2 * | 1/2005 | Cofer et al. ............. 250/341.1 |
| 6,842,540 | B1 * | 1/2005 | Okayama et al. ........... 382/246 |

FOREIGN PATENT DOCUMENTS

| JP | 05006420 A | 1/1993 |
|---|---|---|
| JP | 05006433 A | 11/1993 |
| JP | 10302171 A | 11/1998 |
| JP | 200224542 A | 8/2000 |
| JP | 2001016579 A | 1/2001 |

* cited by examiner

*Primary Examiner*—Bhavesh M. Mehta
*Assistant Examiner*—Gregory Desire
(74) *Attorney, Agent, or Firm*—Staas & Halsey LLP

(57) ABSTRACT

There is provided an image control apparatus which incorporates an automatic configuration mechanism for setting parameters used in event detection, to thereby perform efficient event detection, and improve quality and reliability of image monitoring control. An encoding section encodes an image from a monitoring camera. A reduced image generation section performs simplified decoding of an encoded image to generate a reduced image. A feature amount extraction section detects an image event from the reduced image and extracts feature amounts therefrom. A screen display control section performs screen display control such that a listing of static images of the reduced image is displayed on a display, and a detection event can be set which is an event to be detected. A detection dictionary-preparing section measures variance values from the feature amounts of the detection event to thereby prepare a detection dictionary containing detection parameters which are feature amounts having small variance values. An event detection control section calculates distances between the detection dictionary and the feature amounts to determine a detection range. An image recording section compares the distances and a threshold value for recording images, and based on a result of the comparison, records monitored images.

9 Claims, 21 Drawing Sheets

TYPYCAL FEATURE AMOUNTS FOR DETECTING EVENTS

| |
|---|
| AREA OF DETECTION REGION |
| AVERAGE BRIGHTNESS, AVERAGE COLOR (U, V) WITHIN DETECTION REGION |
| LATERAL, VERTICAL SIZES OF DETECTION REGION |
| COORDINATES OF CENTRAL POSITION |
| COORDINATES OF UPPER LEFT CORNER |
| COORDINATES OF LOWER RIGHT CORNER |
| MOVING SPEED VECTOR |
| AVERAGE MOVING SPEED VECTOR |
| LINEAR MOTION VECTOR |
| DURATION TIME |
| ---- |

FIG. 3

IMAGE CONTROL APPARATUS

BACKGROUND OF THE INVENTION (1) Field of the Invention

This invention relates to an image control apparatus, and more particularly to an image control apparatus for controlling image monitoring.

(2) Description of the Related Art

Recently, due to the rapid development of the image monitoring technique, it is already a technique in the practical use to perform image monitoring by using images compressed by e.g. MPEG, store the monitored images, and distribute such images via a network. Further, with an increase in the volume of storage media, it is also carried out to store image data recorded over a relatively long time period in real time.

However, even if the image monitoring is carried out over a long time of several to several tens of days to store monitored images, it takes immense time to retrieve a desired image from these recorded images.

Therefore, the development of a user-friendly image monitoring technique is even more desired, which is able to extract necessary portions from the recorded images, or record only necessary portions of the recorded images.

Under such circumstances, there has been developed a technique of detecting an event, such as a person, from monitored images. For example, Japanese Laid-Open Patent Publication (Kokai) No. 10-302171 has proposed to additionally carry out a detecting process on images inputted to an MPEG encoder to detect general changes in images, such as differences in background images, to thereby detect a meaningful change (e.g. intrusion of a person) in the images, and based on results of the detection, control recording/non-recording of an MPEG stream of images. This makes it possible to reduce the required capacity of storage media and perform efficient image retrieval.

However, in the general image detection control including the above-described conventional technique, numerical values (of parameters) indicative of an event to be detected, are manually set by an operator who monitors images, individually and separately according to each desired event to be detected. Therefore, this control technique requires all adjustments or configurations to be effected by manual operations, which makes the technique inconvenient to carry out and difficult to perform quantitative configurations. Further, when the point or site for monitoring is changed, the originally set parameters are no longer the optimal ones, which makes it difficult to maintain the image quality.

Thus, the conventional image monitoring technique has failed to provide an efficient way of setting parameters for event detection, which degrades the accuracy of event detection, and hence decreases reliability of the same.

SUMMARY OF THE INVENTION

The present invention has been made in view of these circumstance, and an object thereof is to provide an image control apparatus which incorporates an automatic configuration mechanism for setting parameters used in event detection, to thereby perform efficient event detection, and improve quality and reliability of image monitoring control.

To attain the above object, there is provided an image control apparatus for performing control of image monitoring. The image control apparatus is characterized by comprising encoding means for encoding an image from a monitoring camera, reduced image generation means for performing simplified decoding of an encoded image to generate a reduced image, feature amount extraction means for detecting an image event from the reduced image and extracting feature amounts therefrom, screen display control means for performing screen display control such that a listing of static images of the reduced image is displayed on a display, and a user is allowed to designate any of the static images to thereby set a detection event which is an event to be detected, detection dictionary-preparing means for measuring variance values from the feature amounts of the detection event to thereby prepare a detection dictionary containing detection parameters which are feature amounts having small variance values, event detection control means for calculating distances between the detection dictionary and the feature amounts to determine a detection range, and image-recording means for comparing the distances and a threshold value for recording images, and based on a result of the comparison, recoding monitored images.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 3 is a diagram of a table showing an example of feature amounts of an event;

DESCRIPTION OF THE PREFERRED EMBODIMENT

Figure 1:
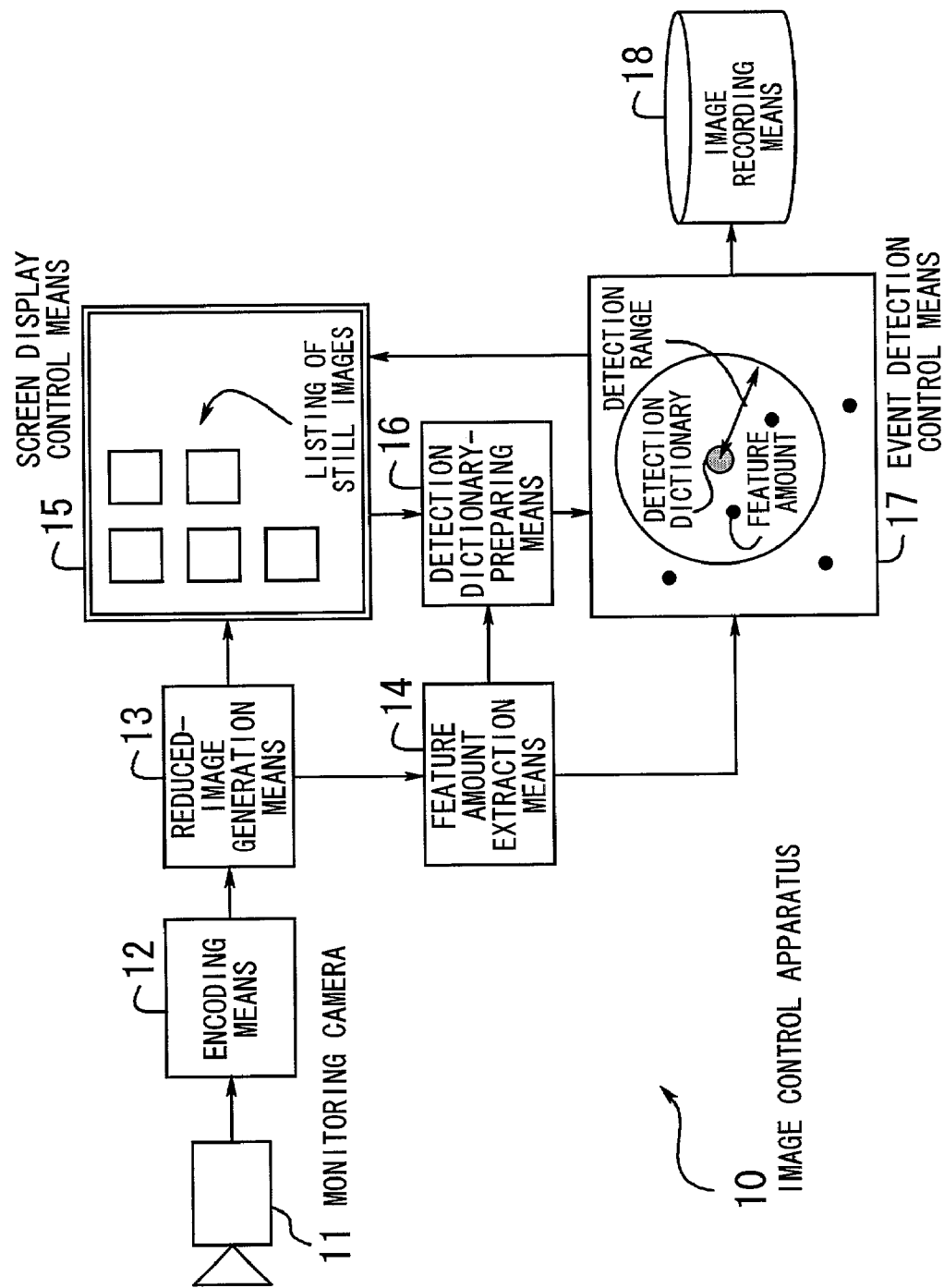
FIG. 1 is a block diagram useful in explaining operating principles of an image control apparatus according to the present invention.

The invention will now be described in detail with reference to drawings showing a preferred embodiment thereof. FIG. 1 is a block diagram showing the operating principles of the present invention. An image control apparatus 10 according to the invention performs image monitoring control of images monitored by a monitoring camera 11.

Encoding means 12 encodes images received from the monitoring camera 11 by an MPEG (Motion Picture Experts Group) system, an H.261 encoding system, or the like. Reduced-image generation means 13 generates reduced images by decoding the encoded images in a simplified manner without decoding the same completely.

Feature amount extraction means 14 detects image events from the reduced images and extracts feature amounts of the image events. Screen display control means 15 carries out screen display control for displaying a listing of still images of reduced images on a screen so as to allow the user to designate still images from the listing to thereby set detection events which are to be detected. Further, on the screen are also displayed a simplified map of objects to be monitored, the position of the installed monitoring camera 11 in the map, a monitored place, etc.

Detection dictionary-preparing means 16 measures variance values of the feature amounts of a detection event to prepare a detection dictionary containing detection parameters defined as feature amounts having small variance values. Therefore, whenever the user designates a detection event, the detection dictionary-preparing means 16 updates and prepares (learns) a new detection dictionary based on the feature amounts of the detection event. Event detection control means 17 calculates the distances between feature amounts and the detection dictionary to determine a detection range for detecting the detection event.

Image recording means 18 compares the distances between respective feature amounts and the detection dictionary, calculated by the event detection control means 17, with thresholds for recording images, and records monitored images based on the results of the comparison.

Figure 2:
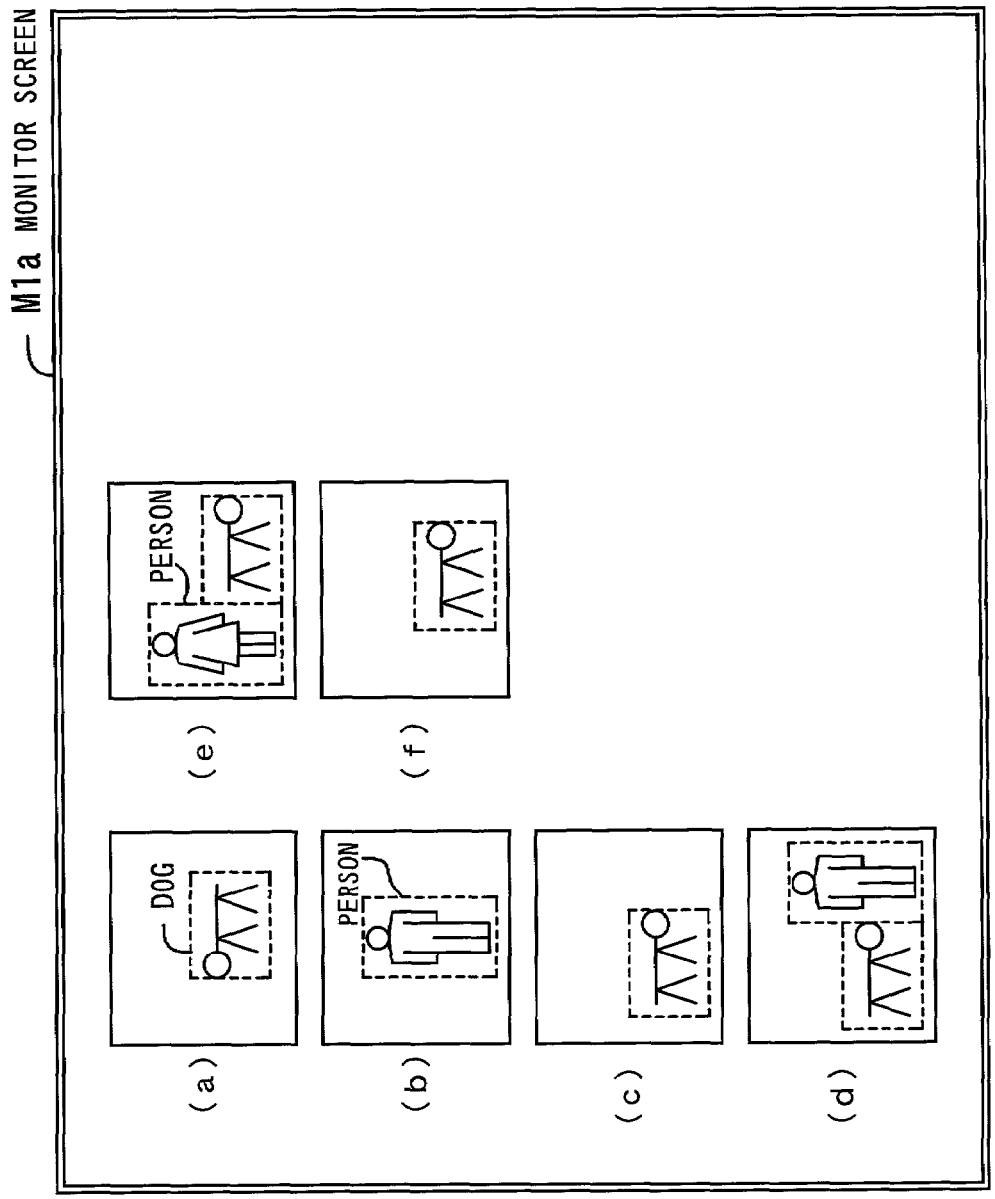
FIG. 2 is a diagram showing an example of a monitor screen displaying still images.

Next, the flow of an event detection process carried out by the image control apparatus 10 will be described in detail hereinafter. FIG. 2 shows an example of display on a monitor screen. When the feature amount extraction means 14 detects a certain event (moving object) via the monitoring camera, the screen display control means 15 displays a still image representing the moving object on the screen M1a of a monitor.

In the figure, still images (a) to (f) are displayed, and hence it is known that persons and dogs are detected (at this stage, if any moving object exists during a predetermined monitoring time period, a still image thereof obtained when the object is detected is displayed irrespective of whether the event is a person or a dog) It should be noted that events in the respective still images are displayed in a state enclosed by frames (dotted frames in the figure) for purposes of ease of understanding. Further, the feature amount extraction means 14 extracts and holds the feature amounts of the above events.

FIG. 3 shows an example of feature amounts. When an event exists in the monitor screen, the feature amount extraction means 14 extracts feature amounts as shown in the figure for an area where the event exists.

Next, when the user desires to detect a person as a detection event, the user designates still images of the person by a pointing device or the like. Here, still images (b), (d), (e) are designated since a person is shown in each of these still images. In response to this designation, the order of displayed images is changed as shown in FIG. 4.

Figure 4:
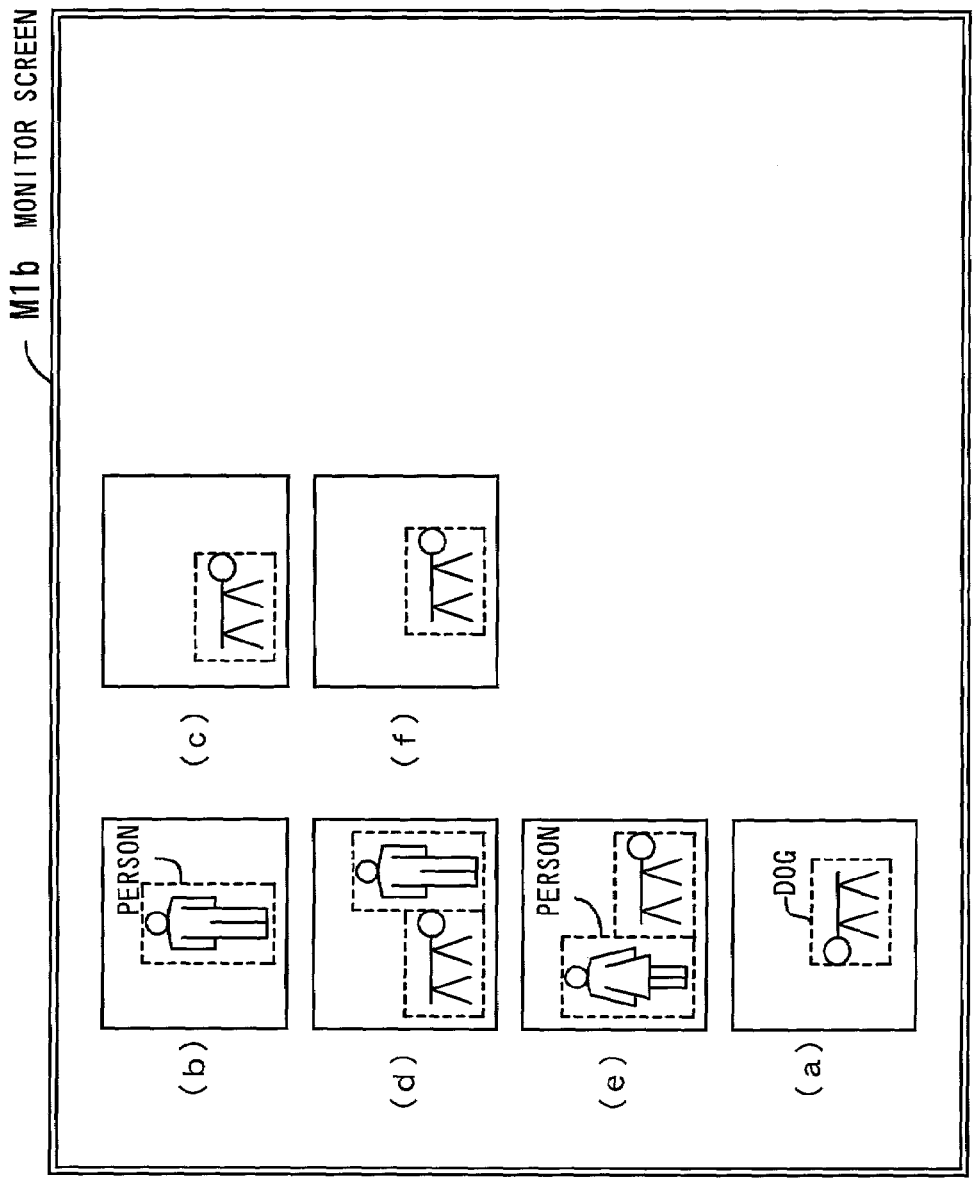
FIG. 4 is a diagram showing a listing of still images after designation by a user.

FIG. 4 shows a listing of still images arranged after the designation by the user is carried out. When the user effects designation in the order of the images (b), (d), (e), the screen display control means 15 changes the monitor screen from the screen M1a to a screen M1b. More specifically, the still images are rearranged such that a still image designated by the user first is placed at an uppermost left position of the monitor screen M1b, and then a still image designated second at a second uppermost left position thereof, and so forth.

Figure 5:
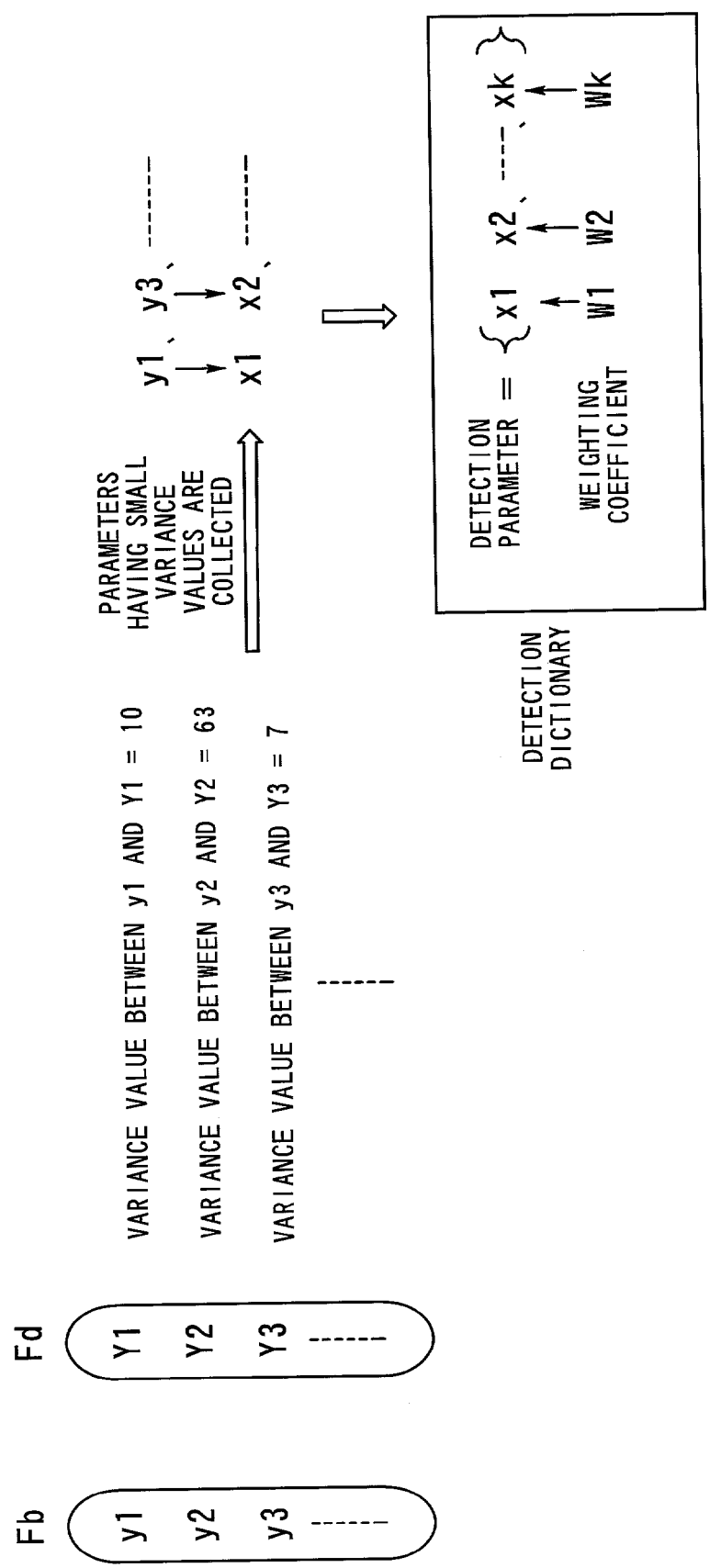
FIG. 5 is a diagram showing a conceptual representation of a process for preparing a detection dictionary.

After the still images are rearranged as described above, a detection dictionary is prepared. FIG. 5 is a diagram showing a conceptual representation of a process for preparing a detection dictionary. The apparatus is configured that in preparing a detection dictionary, detection parameters are updated based on several images located at the upper positions of the screen after the still images have been rearranged. The following description will be given assuming that the detection dictionary is prepared for the first and second uppermost still images on the left-hand side of the screen.

Let it be assumed that the feature amount of an event in the still image (b) and the feature amount of an event indicative of a person in the still image (d) are represented by Fb and Fd, respectively. Further, let it be assumed that the feature amount Fb has parameters y1, y2, y3, . . . , while the feature amount Fd has parameters Y1, Y2, Y3, . . . (here, y1 and Y1 represent the respective parameters of average values of brightness of the events, y2 and Y2 represent the respective parameters of sizes of the same, and y3 and Y3 represent the respective parameters of colors of the same).

First, the detection dictionary-preparing means 16 calculates variance values based on the parameters y1, y2, . . . of the feature amount Fb, and the parameters Y1, Y2, . . . of the feature amount Fd corresponding to the parameters y1, y2, . . . For instance, variance values between corresponding parameters of the feature amounts Fb, Fd are determined as follows: a variance value between the parameters y1 and Y1 representative of average values of brightness is equal to "10", a variance value between the parameters y2 and Y2 representative of sizes is equal to "63", and a variance value between the parameters y3 and Y3 representative of colors is equal to "7".

Then, parameters having small variance values (indicating that the feature amount Fb, Fd are closely related to each other) are collected (parameters of the feature amount Fb side are collected in the illustrated example) and set the collected parameters to detection parameters {x1, x2, . . . xk}.

Further, each detection parameter is caused to be associated with a weighting coefficient Wk which indicates the level of importance of each detection parameter. For instance, the reciprocal of a variance value can be used as a weighting coefficient (if a variance value is small, the value of a corresponding weighting coefficient is set to be large).

As a result, the detection dictionary prepared as above comes to be composed of detection parameters indicative of the features of a person, and when a detection event (event to be detected) is a person, this detection dictionary is used.

Figure 6:
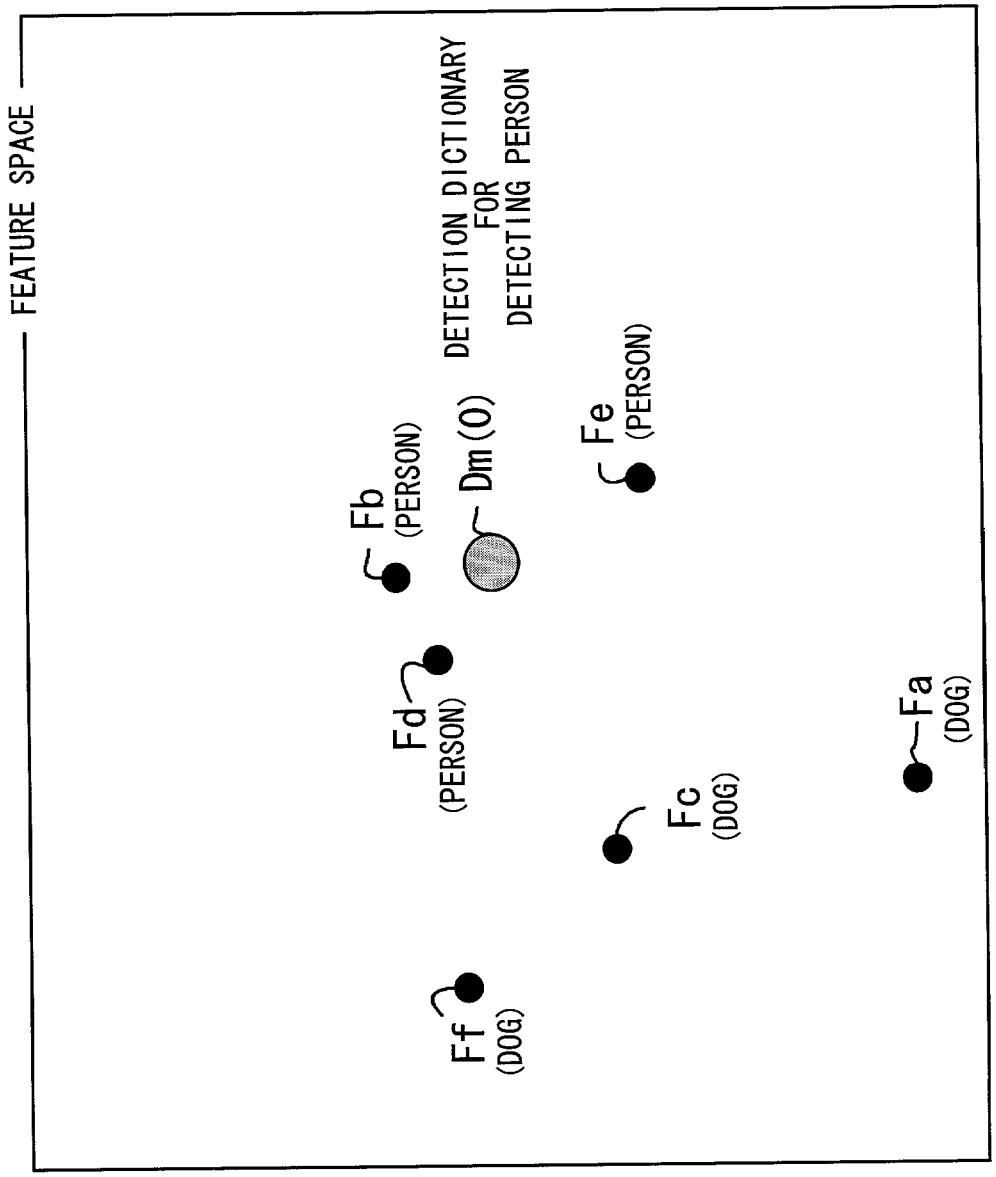
FIG. 6 is a diagram showing a feature space.

FIG. 6 is a diagram showing a feature space. In the feature space, there are shown the feature amounts Fb, Fd, Fe of the events of the persons within the still images (b), (d), (e), the feature amounts Fa, Fc, Ff of the events of the dogs within the still images (a), (c), (f), and a detection dictionary Dm(0) for detecting the persons.

Figure 7:
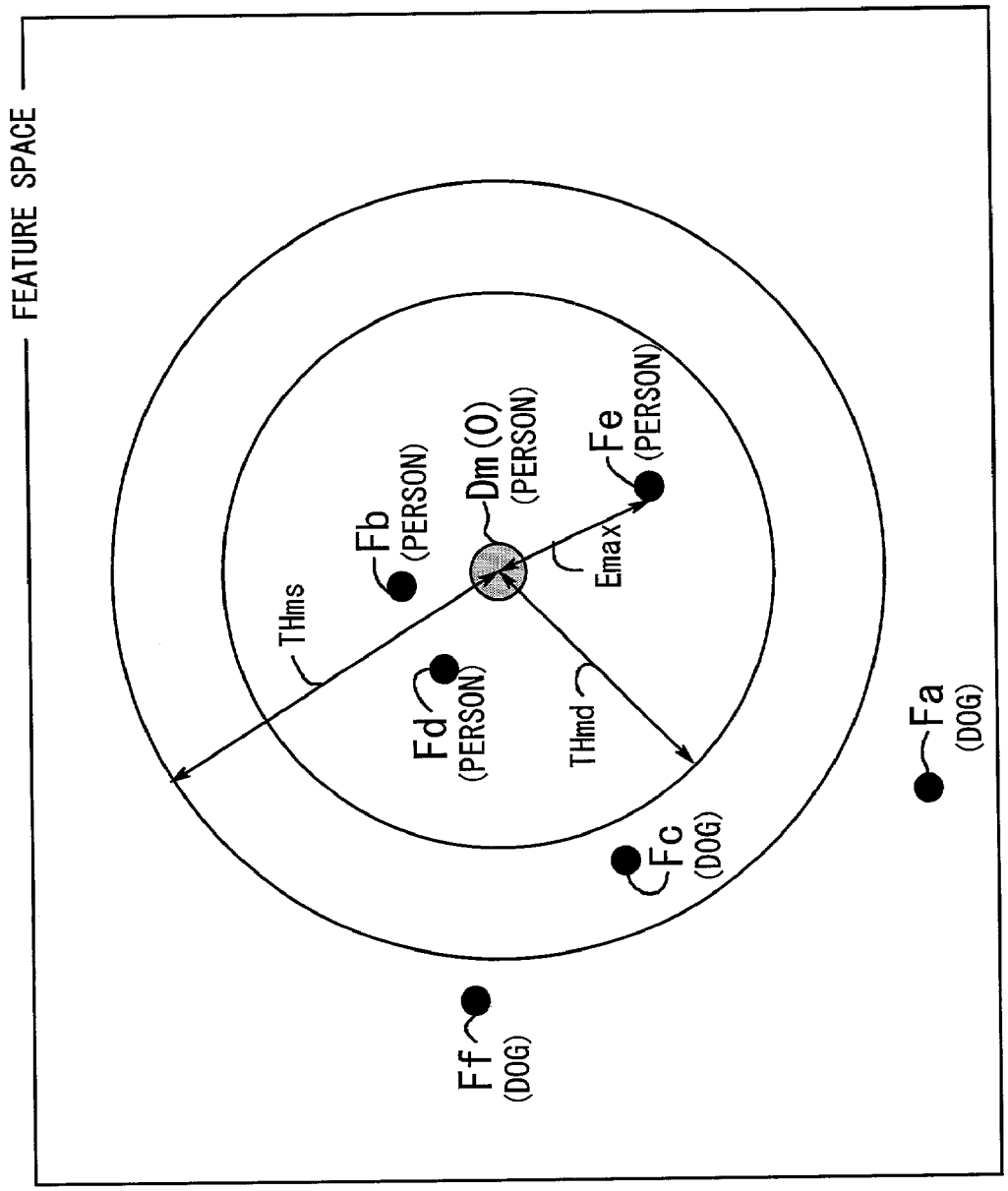
FIG. 7 is a diagram showing a feature space in which a detection range is indicated.

Here, as shown in FIG. 7, the event detection control means 17 sets a detection threshold THmd for notifying the user that an event has been detected (that a person has been detected, in the illustrated example), and a detection threshold THms for storing a feature amount for the detection dictionary Dm(0). More specifically, feature amounts within a radius of THms around the detection dictionary Dm(0) are each considered to have a high possibility of being the feature amount of a person, and hence are stored, while feature amounts within a radius of THmd around the detection dictionary Dm(0) are each considered to allow determination that it is of a person, and hence the user is notified of images including the respective feature amounts within this range(the images are displayed on the monitor screen).

The detection thresholds THmd, THms are calculated by the following equations:

$$THmd = Cthd \cdot Emax \tag{1a}$$

$$THms = Cths \cdot Emax \tag{1b}$$

where Emax designates the maximum value of the distance between a detection event and the detection dictionary, and Cthd, Cths designate constants, provided that the relationship of 1<Cthd<Cths holds.

Further, Emax is obtained by an equation (2), and the distance between each feature amount and the detection dictionary Dm(0) is calculated by an equation (3).

$$E_{max} = \max_{i=b,d,e} E(0, i) \tag{2}$$

$$E(0, i) = \sum_k W_k (D(k) - F(i, k))^2 \tag{3}$$

In the equation (2), E(α, β) means the distance between a feature amount Fα and a feature amount Fβ, so that E(0, i) represents the distance between the detection dictionary Dm(0) and a feature amount Fi (i=b, d, e).

Further, in the equation (3), D(k) means the k-th detection parameter of the detection dictionary Dm(0), F(i, k) means the k-th parameter of Fi (i=b, d, e). Therefore, the equation (3) shows that a sum total of values obtained by calculating Euclidean distances between detection parameters in the detection dictionary and parameters of each feature amount, and multiplying these distances by respective weighting coefficients is set to the distance between the detection dictionary and the feature amount.

FIG. 7 shows a feature space in which a detection range is indicated. The distance between the detection dictionary Dm(0) and each of the feature amounts Fb, Fd, Fe is calculated by the equation (3), and the feature amount having the maximum value of the distance is represented by Fe. Accordingly, the distance between the detection dictionary Dm(0) and the feature amount Fe is represented by Emax, and Thma, THms are calculated by the equations (1a), (1b) to set a detection range as shown in the figure. As a result, the feature amounts Fb, Fd, Fe and the feature amount Fc are within a storage range for storing feature amounts, and the feature amounts Fb, Fd, Fe are within a notification range for notifying the user of an event.

Next, processing for preventing erroneous detection will be described hereinafter. Although detection of a person (b) (a person in the still image (b) is denoted as a person (b), and the same denotation method applies hereinafter), a person (d), and a person (e) is reliably carried out through the above processing, there is a fear that erroneous detection can occur if the detection further continues to be performed.

Figure 8:
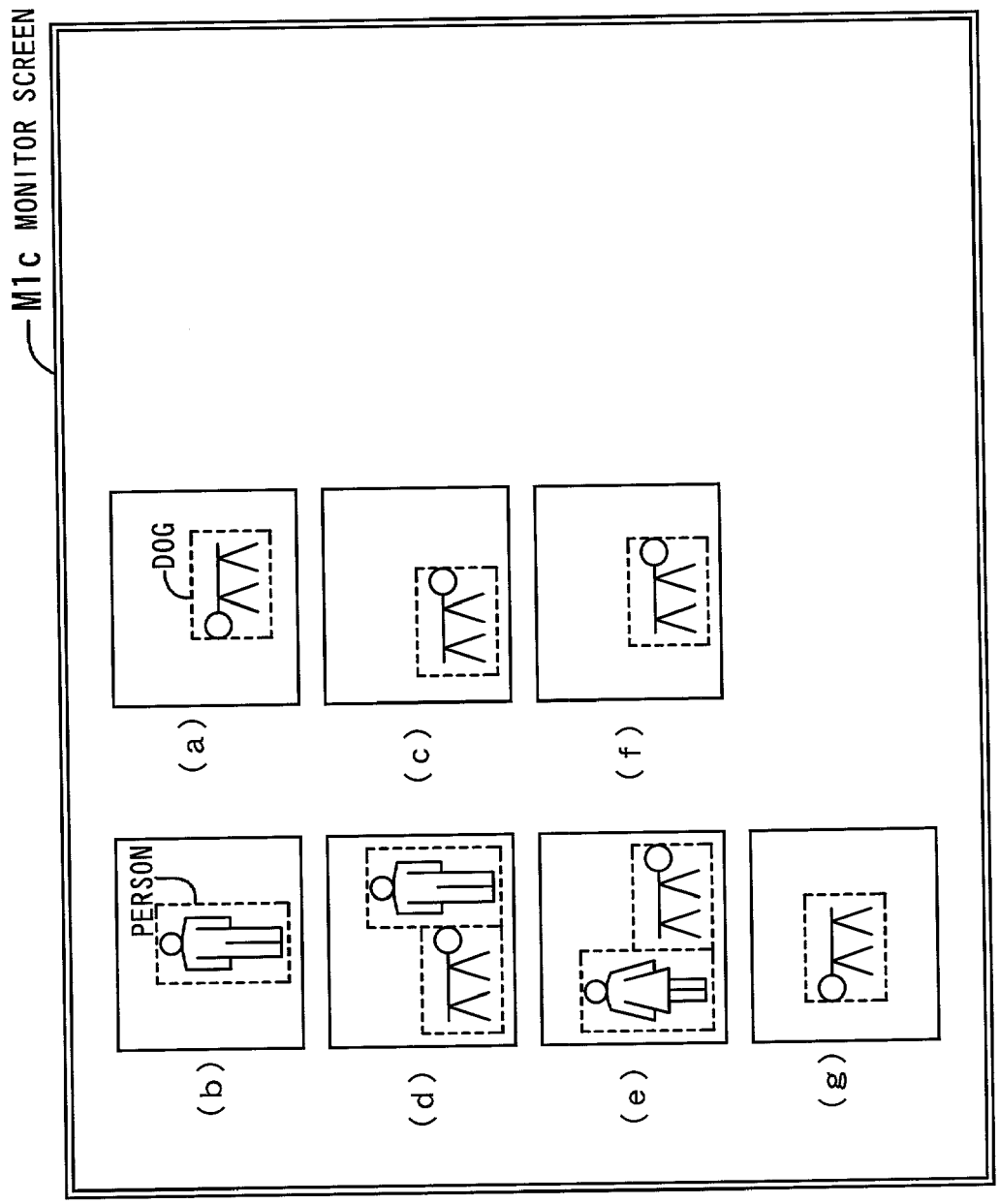
FIG. 8 is a diagram showing a monitor screen displaying still images.
Figure 9:
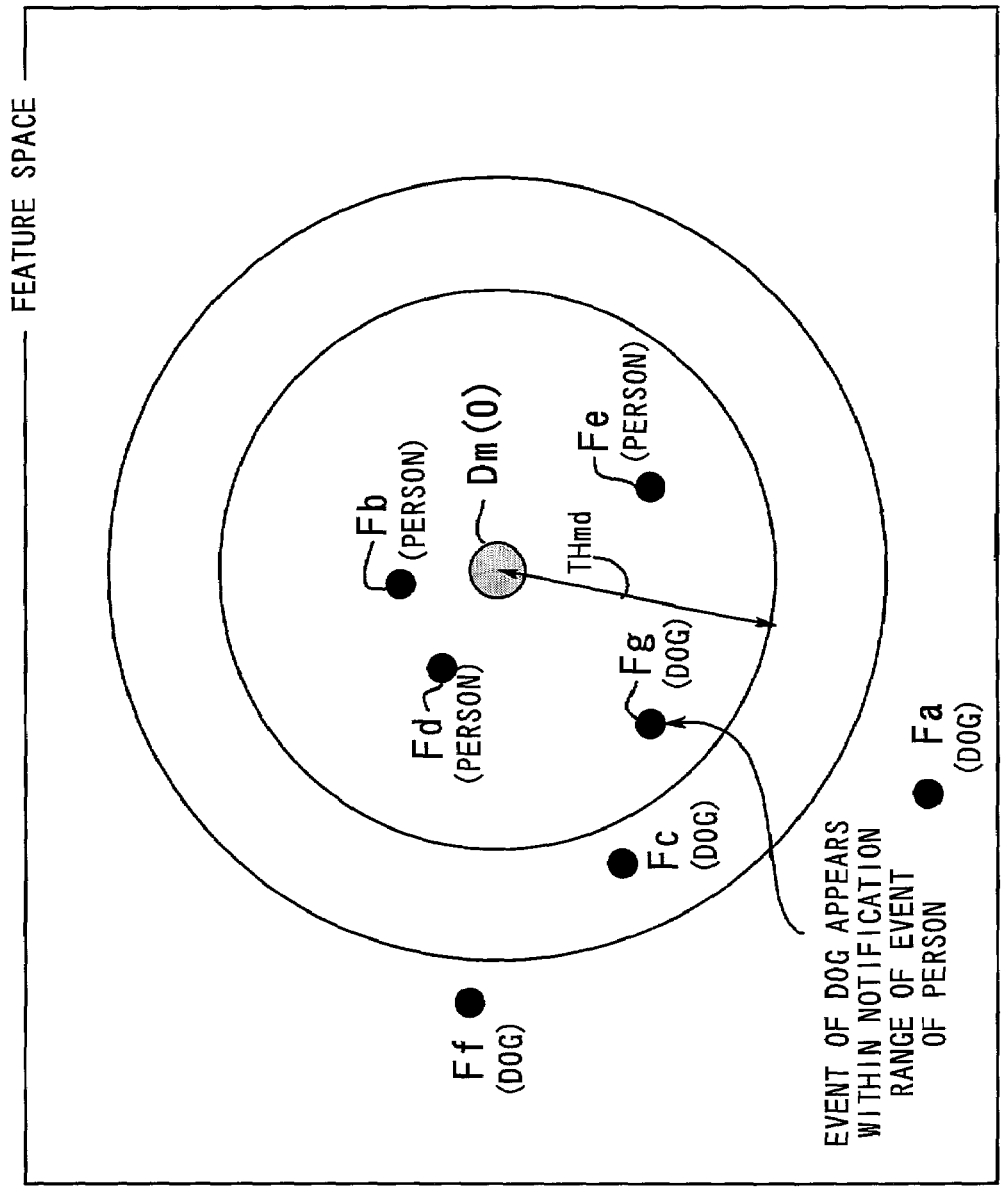
FIG. 9 is a diagram showing a feature space.

FIG. 8 shows an example of a screen displaying still images, and FIG. 9 shows a feature space. As shown in FIG. 8, a new still image (g) is generated in the monitor screen M1c. However, the detected image is of a dog, and not preferable for purposes of detecting a person. In FIG. 9, the detected event is shown as a feature amount Fg appearing within the radius of THmd. There are two methods for preventing such an erroneous detection.

First prevention processing is carried out as follows: If each of E(0, b), E(0, d), E(0, e) is smaller than E(0, g) which represents the distance between the feature amount Fg of the undesired detection event and the detection dictionary Dm(0), a new detection threshold THmd1 is calculated by the following equation:

$$THmd1 = (Emax + E(0, g))/2 \tag{4}$$

Figure 10:
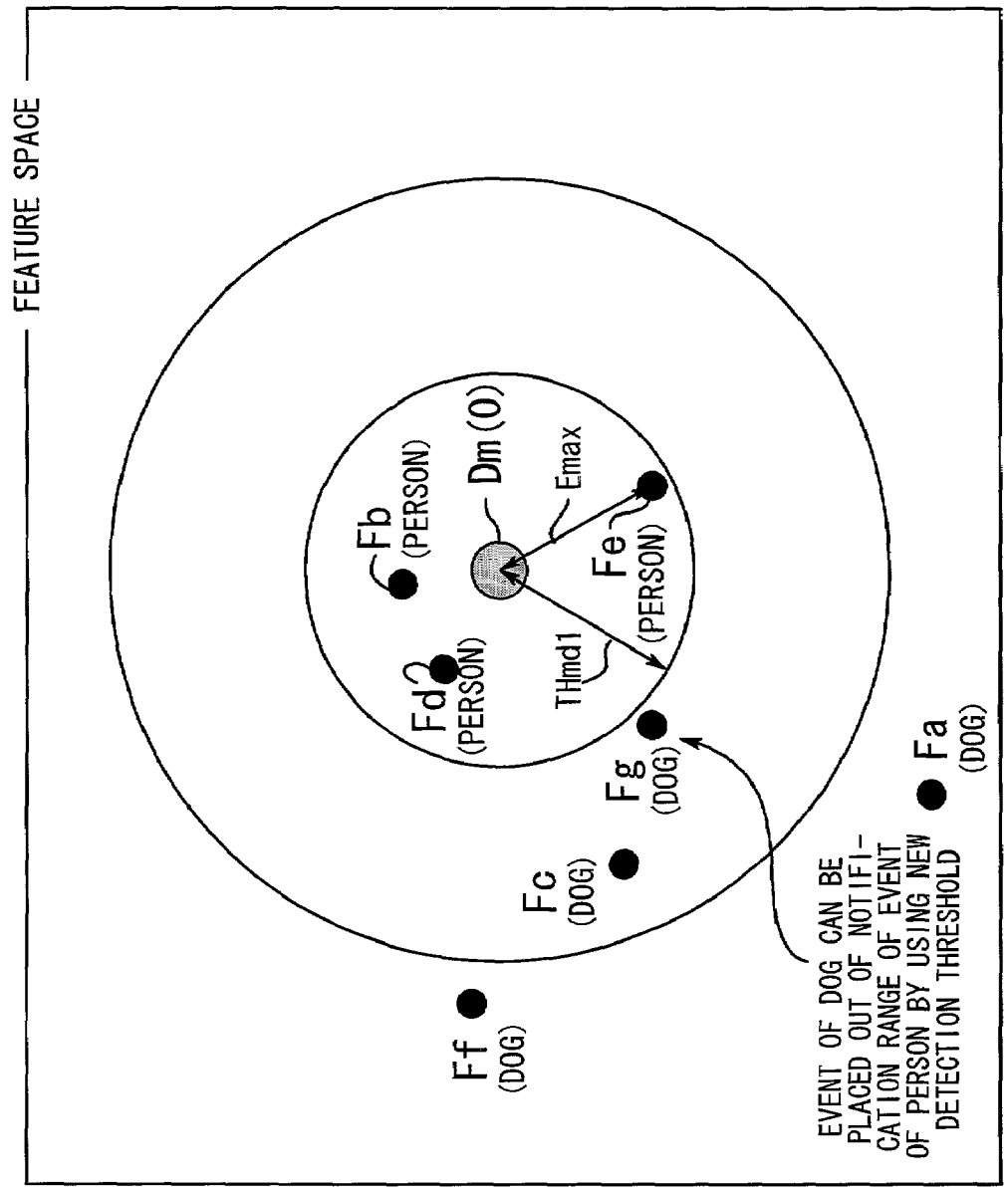
FIG. 10 is a diagram showing a feature space in which a new detection threshold is set.

FIG. 10 shows a feature space in which the new detection threshold is set. As shown in the figure, the new detection threshold THmdl calculated by the equation (4) enables E(0, g) to be placed out of the notification range, thereby making it possible to prevent erroneous detection.

Figure 11:
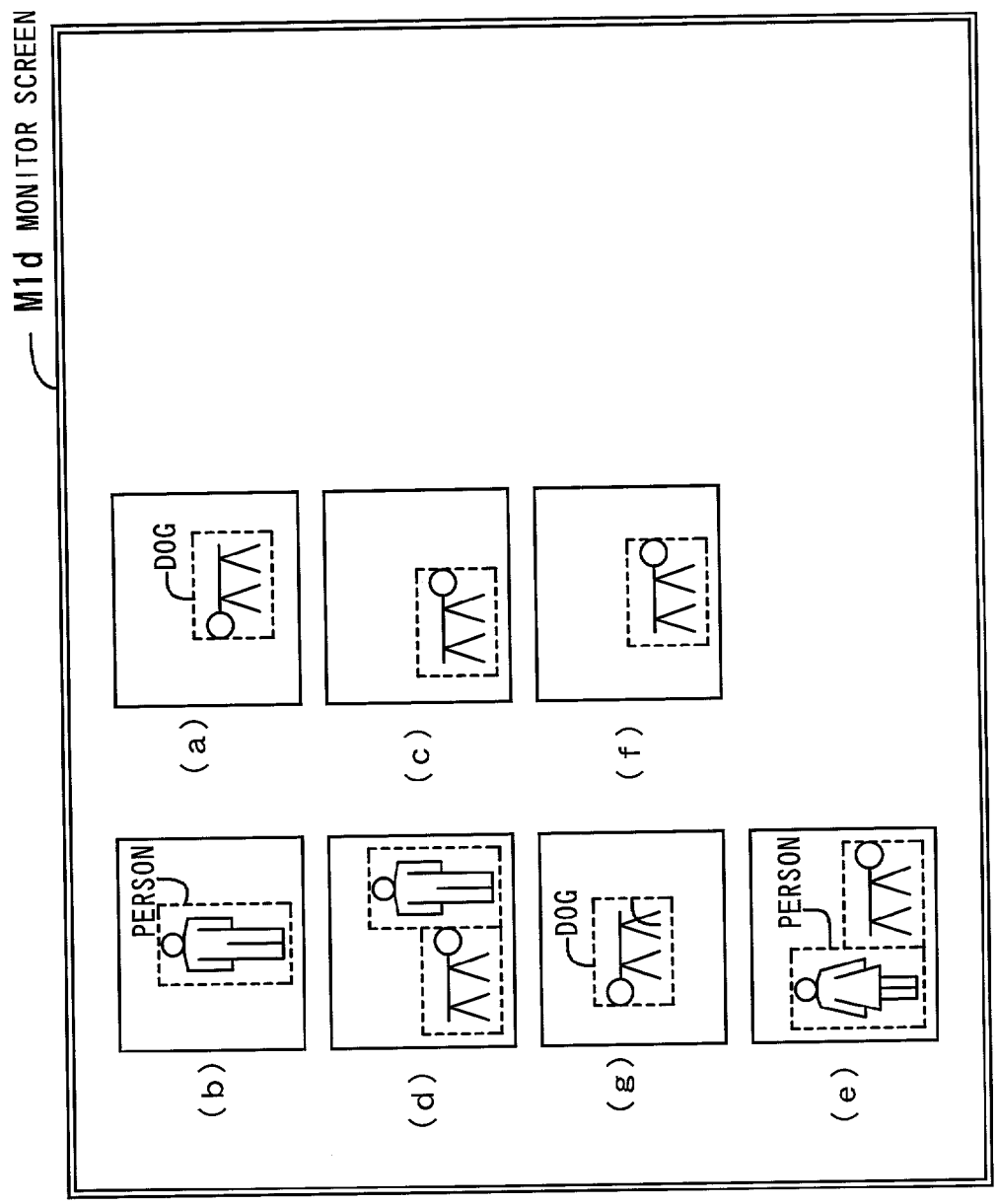
FIG. 11 is a diagram showing a monitor screen displaying still images.
Figure 12:
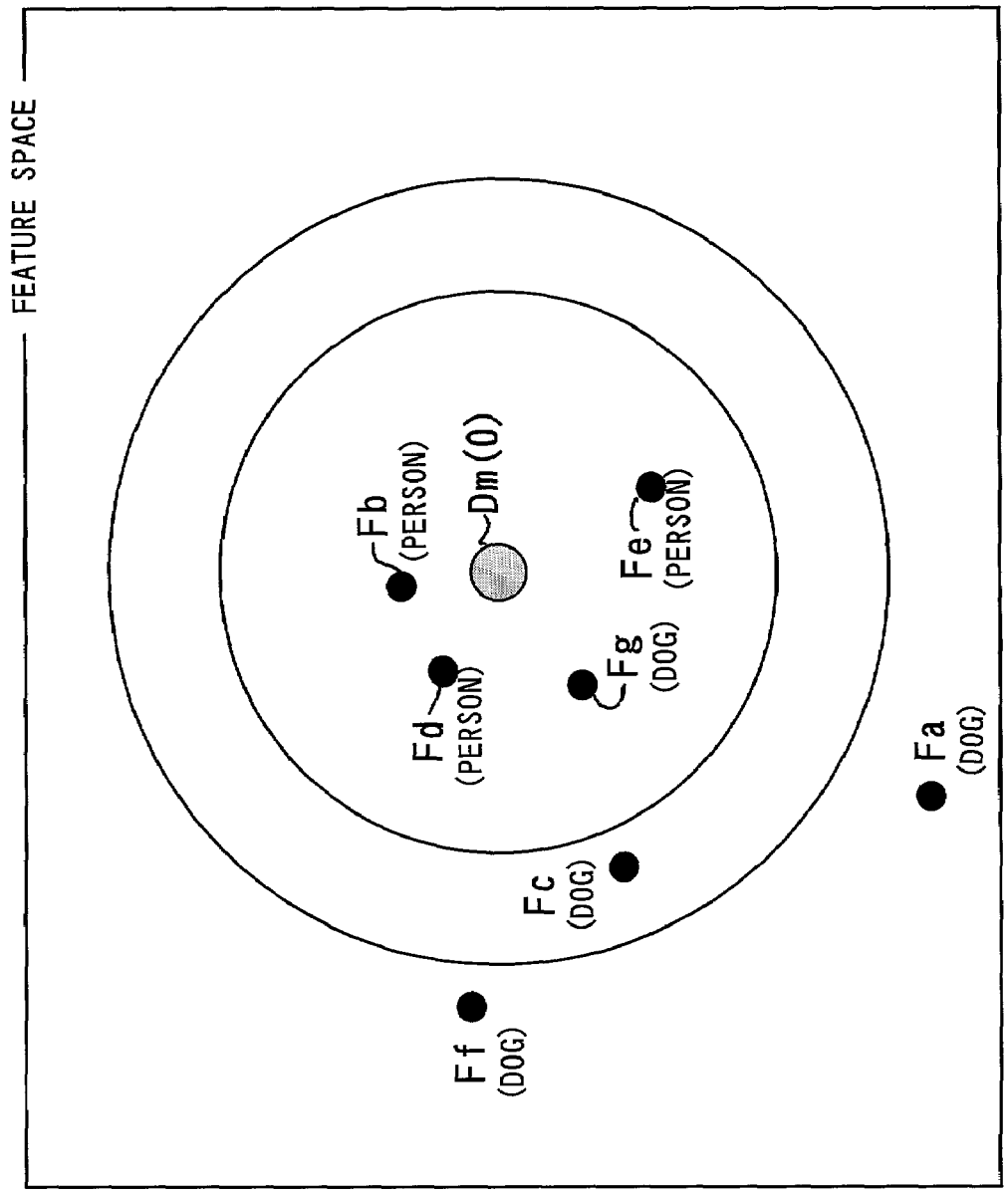
FIG. 12 is a diagram showing a feature space.

Next, second prevention processing for preventing erroneous detection will be described. FIG. 11 shows an example of a screen displaying still images, and FIG. 12 shows a feature space. As shown in FIG. 11, the still image (g) containing the detected event of a dog is displayed at a third uppermost left position of a monitor screen M1d. This is shown in the FIG. 12 feature space as the feature amount Fg appearing at a location nearer to the detection dictionary Dm(0) than the feature amount Fe.

Although in the case of the first prevention processing described above, the condition is set such that all of E(0, b), E(0, d), E(0, e) are smaller than E(0, g), this condition is not satisfied in the case of FIG. 12. To overcome this problem, the detection dictionary-preparing means 16 prepares a non-detection dictionary for preventing such an erroneous detection.

Figure 13:
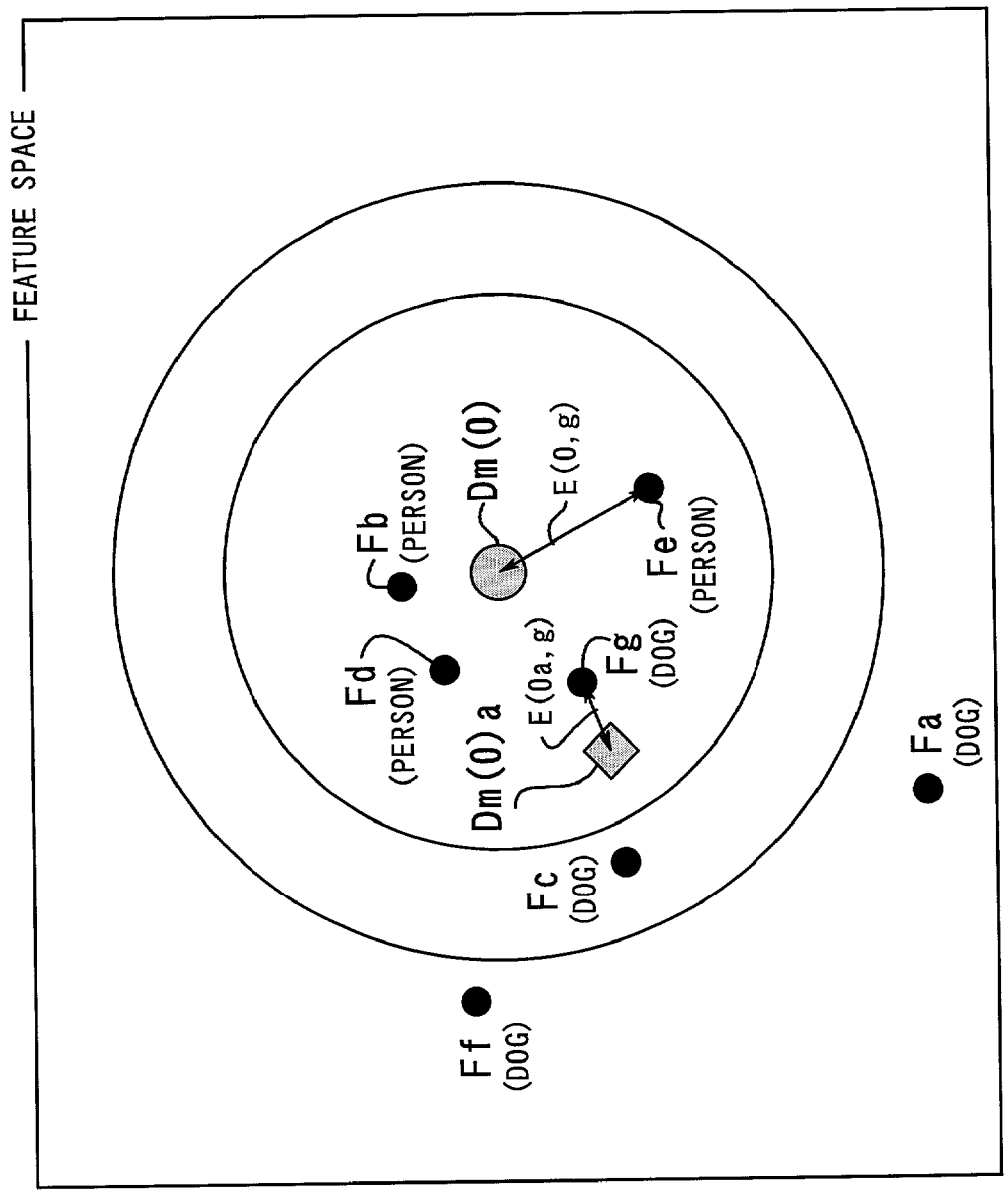
FIG. 13 is a diagram showing a feature space in which a non-detection dictionary is shown.

FIG. 13 shows a feature space wherein the non-detection dictionary is shown. In preparing the non-detection dictionary, first, the user designates the still image (g). Then, the detection dictionary-preparing means 16 puts together several non-detection objects to prepare the non-detection dictionary Dm(0)a for non-detection objects.

To prepare the non-detection dictionary Dm(0)a, the feature amounts of the events Fa, Fc, Ff, Fg are used (procedure for preparing the non-detection dictionary is the same as that shown in FIG. 5). When the non-detection dictionary Dm(0)a is set based on the feature amounts, the event detection control means 17 compares the distance E(0, g) between the detection dictionary Dm(0) and the feature amount Fg and the distance E(0a, g) between the non-detection dictionary Dm(0)a and the feature amount Fg with each other. If E(0, g)<E(0a, g), the event g is determined to be detected as of an event of a person, whereas if E(0, g)>E(0a, g), the event g is determined not to be detected as an event of a person.

Next, a user setting operation for setting a detection range will be described. As described hereinabove, when a detection event or a non-detection event appears on the screen in some form or other, the detection dictionary or the non-detection dictionary can be prepared/updated by designating e.g. a still image generated at a time point of occurrence of the event. However, although the fact that a detection event has occurred is already known, there is a possibility that the detection event is not displayed on the detection screen. To overcome this problem, the present invention provides a function which enables the user to change a detection threshold as he desires.

Figure 14:
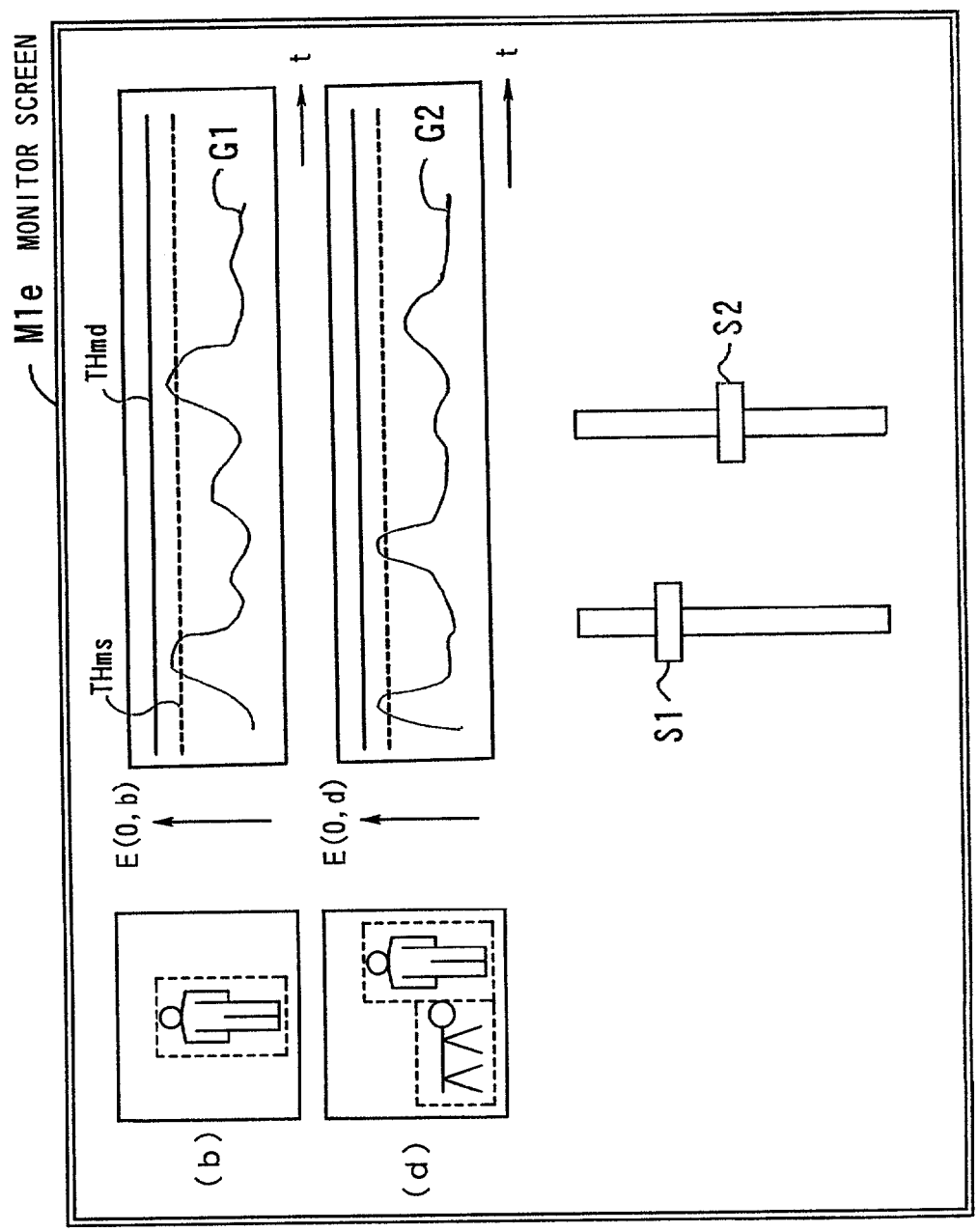
FIG. 14 is a diagram showing an example of a monitor screen from which the user is capable of setting a detection threshold.

FIG. 14 shows an example of a monitor screen which enables the user to set a detection threshold. On a monitor screen M1e, there are shown not only a listing of still images (only the still images (b), (d) are shown in this example) but also graphs G1, G2 which schematically show changes in the distances E(0, b), E(0, d) between the detection dictionary Dm(0) and the respective feature amounts Fb, Fd with the lapse of time, and sliders S1, S2 enabling the user to variably set the detection thresholds THmd, THms. Further, solid straight lines in the graphs indicate THmd which represents the notification range for notifying the user of occurrence of events, and dotted lines indicate THms which represents the storage range for storing feature amounts.

When the user moves the sliders S1, S2 by a pointing device or the like on the screen configured as above to change a detection threshold, still images displayed are also changed. As described above, screen display control is carried out for permitting the user to set a detection threshold as he desires, thereby making it possible to flexibly change the still images of detection events displayed on the screen as well as the order of display thereof.

Next, the image recording means 18 will be described hereinafter. Although, principally, all the images containing events having feature amounts within the range of the detection threshold THms are recorded by the image recording means 18, this is not limitative, but another threshold for use in recording images may be provided for comparing the distance between each feature amount and the detection dictionary and a threshold for recording images, and based the results of comparison, monitored images may be recorded.

More specifically, a distance E(0, i) and the threshold for recording images are compared with each other to extract E(0, i) larger than the threshold, and recording timing for recording images containing events having a feature amount Fi which provides the distance E(0, i) is generated, to record these images. This makes it possible to record only necessary ones of monitored images, and hence it is possible to reduce the required capacity of a recording medium and carry out efficient image recording processing.

Next, the reduced-image generation means 13 will be described. The reduced-image generation means 13 receives a coded stream which is subjected to hybrid-encoding of DCT (Discrete Cosine Transform) plus motion compensation by the encoding means 12, and decodes the encoded stream by carrying out frame thinning, VLD (Variable Length Decoding), IQ (Inverse Quantization), and IDCT (Inverse Discrete Cosine Transform) on the stream, thereby generating a reduced image.

It should be noted that when the frame thinning is performed, e.g. in the case of an MPEG stream, each picture header is recognized from a bit pattern in the stream, and an I picture and a P picture are extracted as images after the frame thinning.

Further, in the reduced-image generation means 13, in order to obtain a reduced image through a small operation quantity, a coded stream is decoded not with a high resolution but with a low resolution (to reduce to ½, ¼, or ⅛ resolution). Further, an image is processed not at a frame rate of 30 frames/second as it is but at a lower frame rate, such as 10 frames/second, 5 frames/second.

Figure 15:
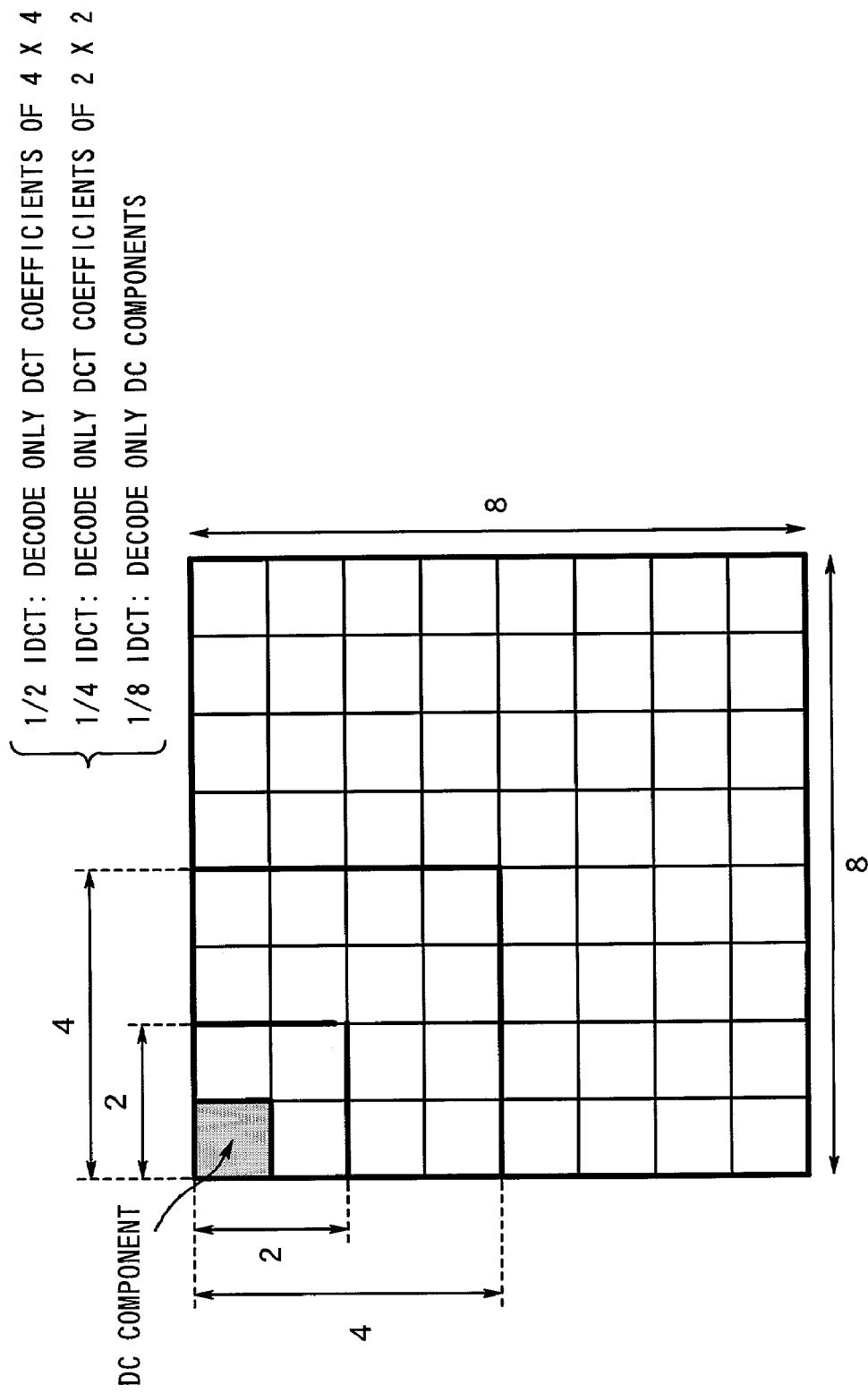
FIG. 15 is a diagram illustrating the concept of a reduced IDCT.

In the present invention, to lower the resolution of an image, when the DCT-encoded stream (I picture) is subjected to IDCT processing, reduced IDCT is carried out. FIG. 15 illustrates the concept of the reduced IDCT. Normally, 8×8 DCT is subjected to 8×8 IDCT. In the present invention, however, ½ IDCT of 4×4 IDCT, ¼ IDCT of 2×2 IDCT, or ⅛ IDCT using only a DC component is carried out. The reduction ratio for use is automatically selected from these ratios according to the size of an event to be detected. Through this control, a reduced image necessary for detecting an event can be efficiently produced.

It should be noted that shown below are a normal 8×8 IDCT computing equation (5), a 4×4 IDCT computing equation (6), and a 2×2 IDCT computing equation (7). In the 8×8 IDCT computation, a process of carrying out a product-sum computation 24 times is carried out 16 times. In the 4×4 IDCT computation, a process of carrying out a product-sum computation 14 times is carried out 8 (4+4) times to thereby produce a ½ reduced image, while in the 2×2 IDCT computation, a process of carrying out a product-sum computation 5 times is carried out 4 (2+2) times to thereby produce a ¼ compressed image.

$$f(x, y) = \qquad (5)$$
$$(1/4)\sum_{u=0}^{7}\sum_{v=0}^{7} C(u)C(v)F(u, v) \cdot \cos\left(\frac{2(x+1)u \cdot \pi}{16}\right)\cos\left(\frac{2(y+1)v \cdot \pi}{16}\right)$$

$$C(u), C(v) = \begin{cases} \frac{1}{\sqrt{2}} & \text{for } u, v = 0 \\ 1 & \text{otherwise} \end{cases}$$

$$f(x, y) = \qquad (6)$$
$$(1/2)\sum_{u=0}^{3}\sum_{v=0}^{3} C(u)C(v)F(u, v) \cdot \cos\left(\frac{2(x+1)u \cdot \pi}{16}\right)\cos\left(\frac{2(y+1)v \cdot \pi}{16}\right)$$

$$C(u), C(v) = \begin{cases} \frac{1}{\sqrt{2}} & \text{for } u, v = 0 \\ 1 & \text{otherwise} \end{cases}$$

$$f(x, y) = \qquad (7)$$
$$\sum_{u=0}^{1}\sum_{v=0}^{1} C(u)C(v)F(u, v) \cdot \cos\left(\frac{2(x+1)u \cdot \pi}{16}\right)\cos\left(\frac{2(y+1)v \cdot \pi}{16}\right)$$

$$C(u), C(v) = \begin{cases} \frac{1}{\sqrt{2}} & \text{for } u, v = 0 \\ 1 & \text{otherwise} \end{cases}$$

Thus, in the simplified decoding of MPEG encoded data, as to an I picture, DCT coefficients of a sub-sample image are taken out from all DCT coefficients, and DCT coefficients for a reduced image are generated to thereby produce the reduced image efficiently.

On the other hand, as to an intra-image and motion compensation image, similarly to the I picture, simplified decoding is carried out and at the same time, simplified processing of image correction is carried out according to motion vector values obtained from the motion compensation computation.

Figure 16:
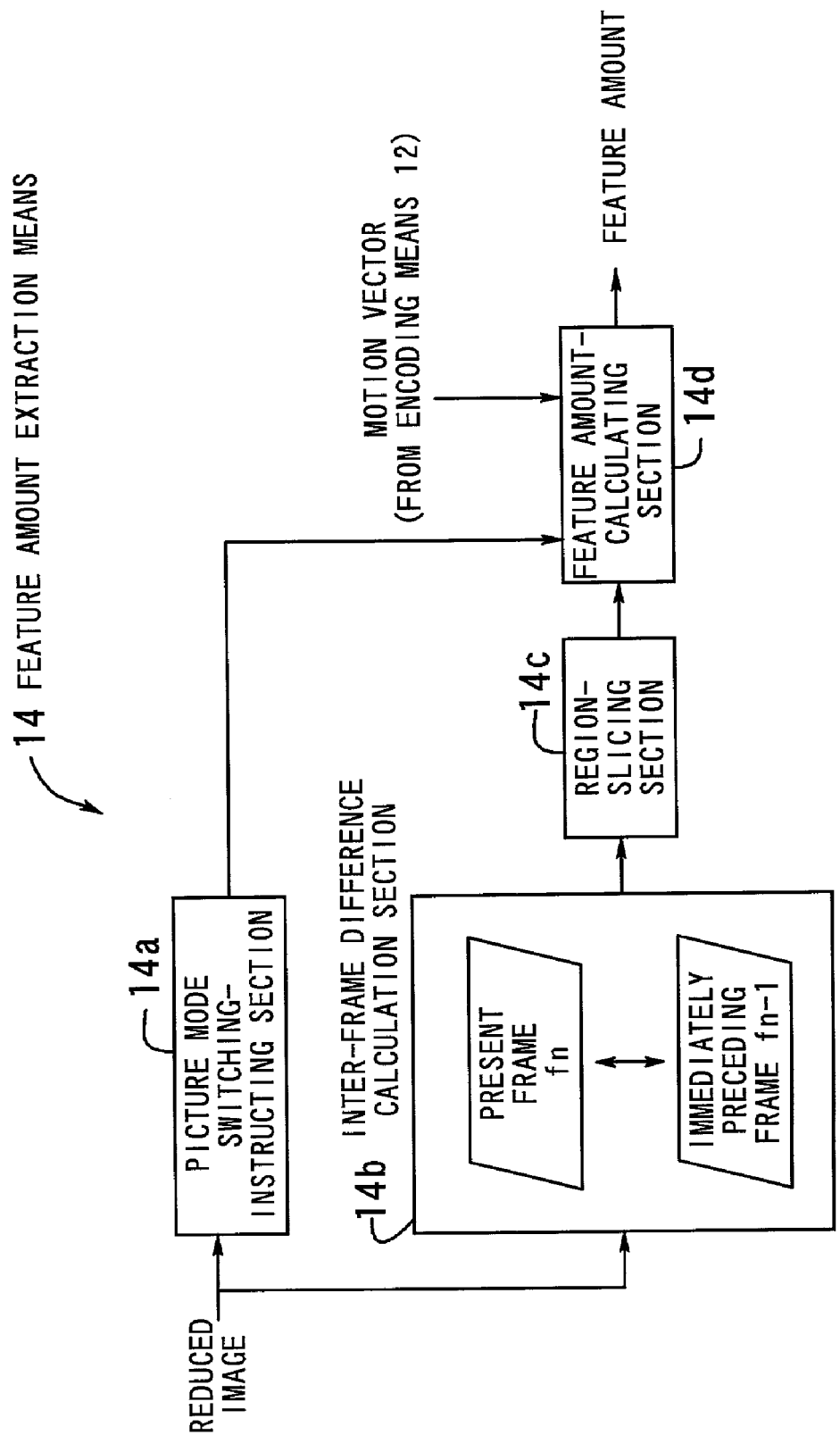
FIG. 16 is a diagram showing the construction of feature amount extraction means.

Next, the feature amount extraction means 14 will be described. FIG. 16 shows the construction of the feature amount extraction means 14. The feature amount extraction means 14 is comprised of a picture mode switching-instructing section 14a, an inter-frame difference calculation section 14b, a region-slicing section 14c and a feature amount-calculating section 14d.

The picture mode switching-instructing section 14a informs a change in picture when the switching from a P picture to an I picture is carried out. At this stage, the I picture is generated by compressing all image blocks by using DCT-converted coefficients, but the P picture is compressed by hybrid encoding including motion compensation, so that when an image stream sent out e.g. in the order of I, P, P, P, . . . , P pictures as in the case of a general MPEG motion picture is subjected to the simplified decoding as described above, the P picture-generating computation includes an error.

Due to this error, when images obtained by simplified decoding of images received in the order of I, P, P, P, . . . , P, I, P, P, P, . . . are observed, decoding errors occurring in the simplified reproduction of P pictures are accumulated to make the following latter part of the P picture blurred. Further, an I picture corresponding to an original image is regularly reproduced. Therefore, a phenomenon is observed in which a progressively blurred image turns into a clear image whenever an I picture is generated.

When detection of an event is carried out by using images formed by simplified decoding of a stream of compressed motions pictures, such a change in the images produces a change as an inter-frame difference for a portion that should not undergo any change by nature, which becomes a factor of erroneous detection.

From a picture header within a bit stream, the feature amount extraction means 14 is capable of easily discerning in advance that images are sent e.g. in the order of I, P, P, . . . , I, P, P, P, . . . , and therefore, by using this information, when a frame is received of which it can be expected that erroneous detection occurs due to an inter-frame difference caused by simplified decoding, i.e. when a P picture is switched to an I picture, the feature extraction, and detecting/determining operations for detecting an image event at the frame is suspended, and parameters determined by analogy from information of the immediately preceding and following frames are set to feature amounts of the frame, whereby it is possible to reduce detection of unnecessary events.

The inter-frame difference calculation section 14b calculates a difference between the present frame (fn) and the immediately preceding frame (fn–1) of a received reduced image. The region-slicing section 14c extracts a motion picture region existing in a inter-frame difference image. The method of extraction of a motion picture region is to subject the inter-frame difference image to horizontal histogram computation to slice a horizontal portion, and then to vertical histogram computation to slice a vertical portion, to thereby extract the motion picture region.

Figure 17:
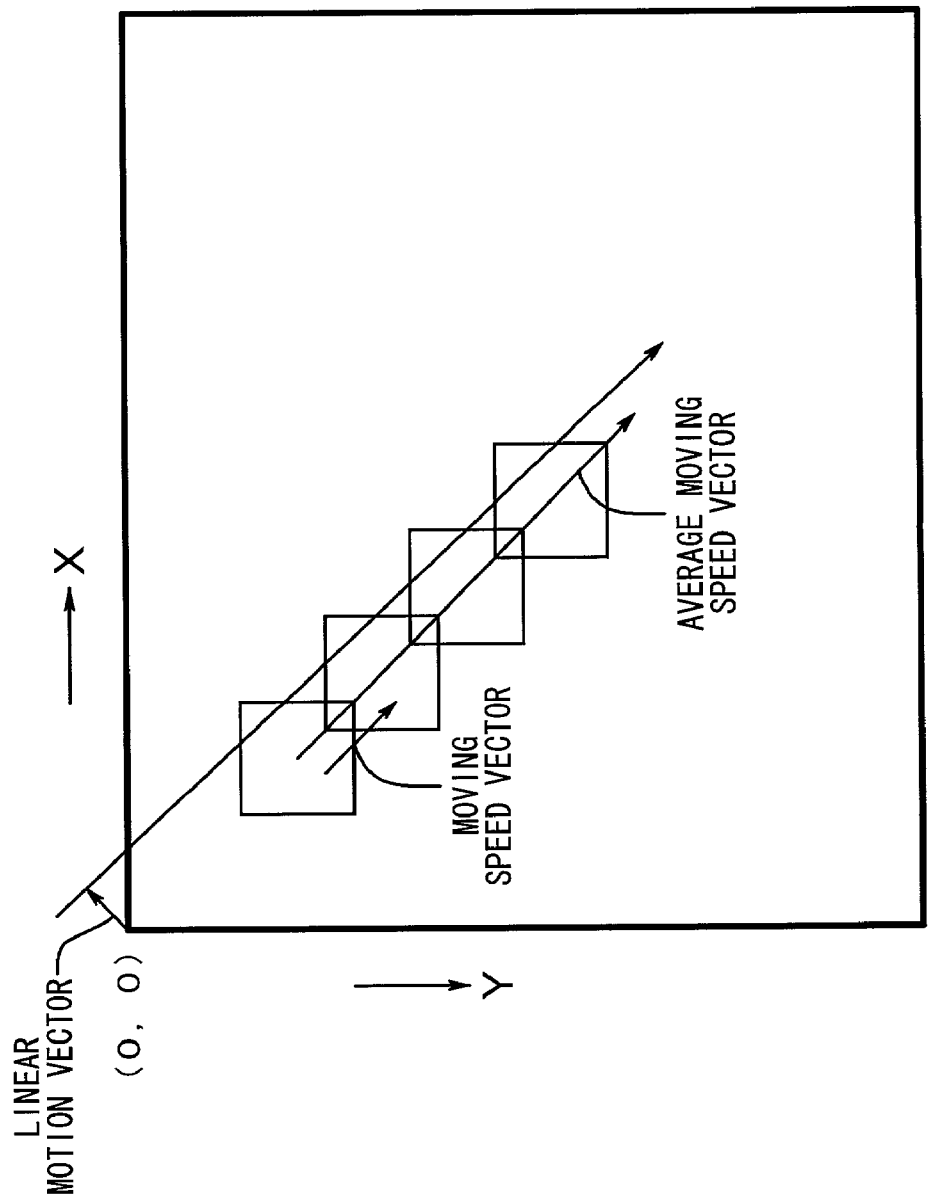
FIG. 17 is a diagram showing vector information.

Then, the feature amount-calculating section 14d calculates the feature amounts as described above with reference to FIG. 3. Further, based on motion vectors from the encoding means 12, information of various vectors is determined as information of motions in the region. FIG. 17 is a diagram showing information of vectors. The difference between the center position of an object area existing in the immediately preceding frame and the center position of the same existing in the present frame is represented by a moving speed vector (vx, vy). An average value of motion amounts calculated as to successive moving regions is an average moving speed vector (vsx,vsy).

Further, a linear motion vector (lx, ly) approximately shows a path in which a moving region moves on the screen. This linear motion vector approximates a path of the central position of the moving area over the whole motion detecting time by an approximating straight line, and is represented by a vector connecting between a point of intersection of a straight line extending from an origin (0,0) across the approximating straight line and the origin. The linear motion vector changes such that when the moving area moves vertically, the linear motion vector is represented as (c,0), where c is a constant, and when the moving area moves horizontally, the same is represented as (0,c), where c is a constant.

Figure 18:
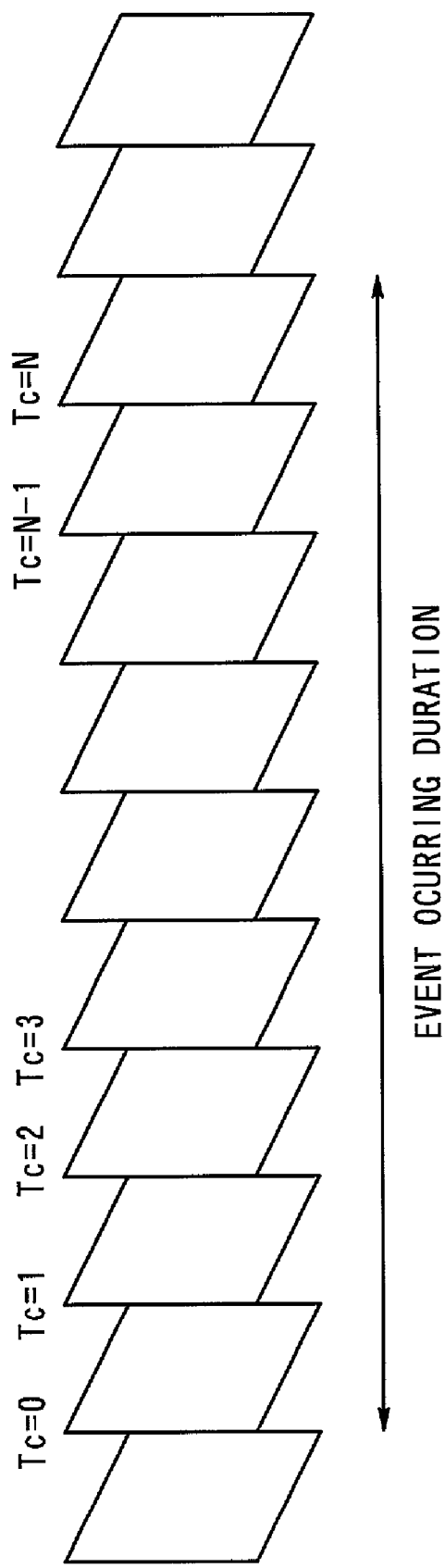
FIG. 18 is a diagram useful in explaining a duration period as a feature amount of an event.

The feature amount-calculating section 14d measures the count Tc after occurrence of a moving area up to the present frame to determine a duration time during which the event of the moving area continues. FIG. 18 is a diagram useful for explaining a duration time as a feature amount of an event.

When an image event occurs, the count Tc is set to an initial value of 1, and so long as an area containing the event continues to successively occur in each frame, the count Tc is incremented by 1 (Tc=Tc+1) per detected frame, as to the area being updated. Thus, the duration time of an extracted area contained in the present frame is counted.

Figure 19:
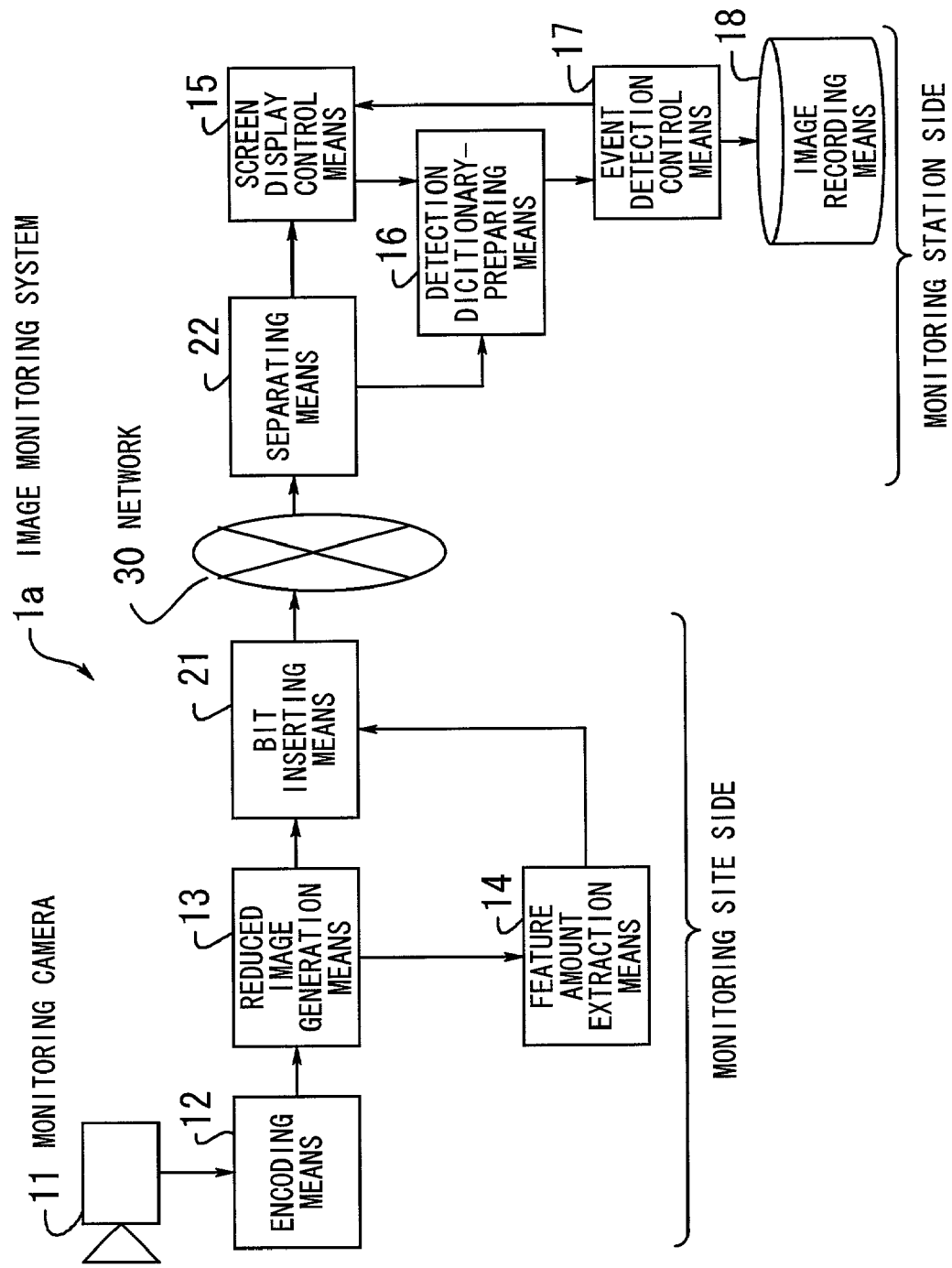
FIG. 19 is a diagram showing the arrangement of an image monitoring system incorporating the image control apparatus.
Figure 20:
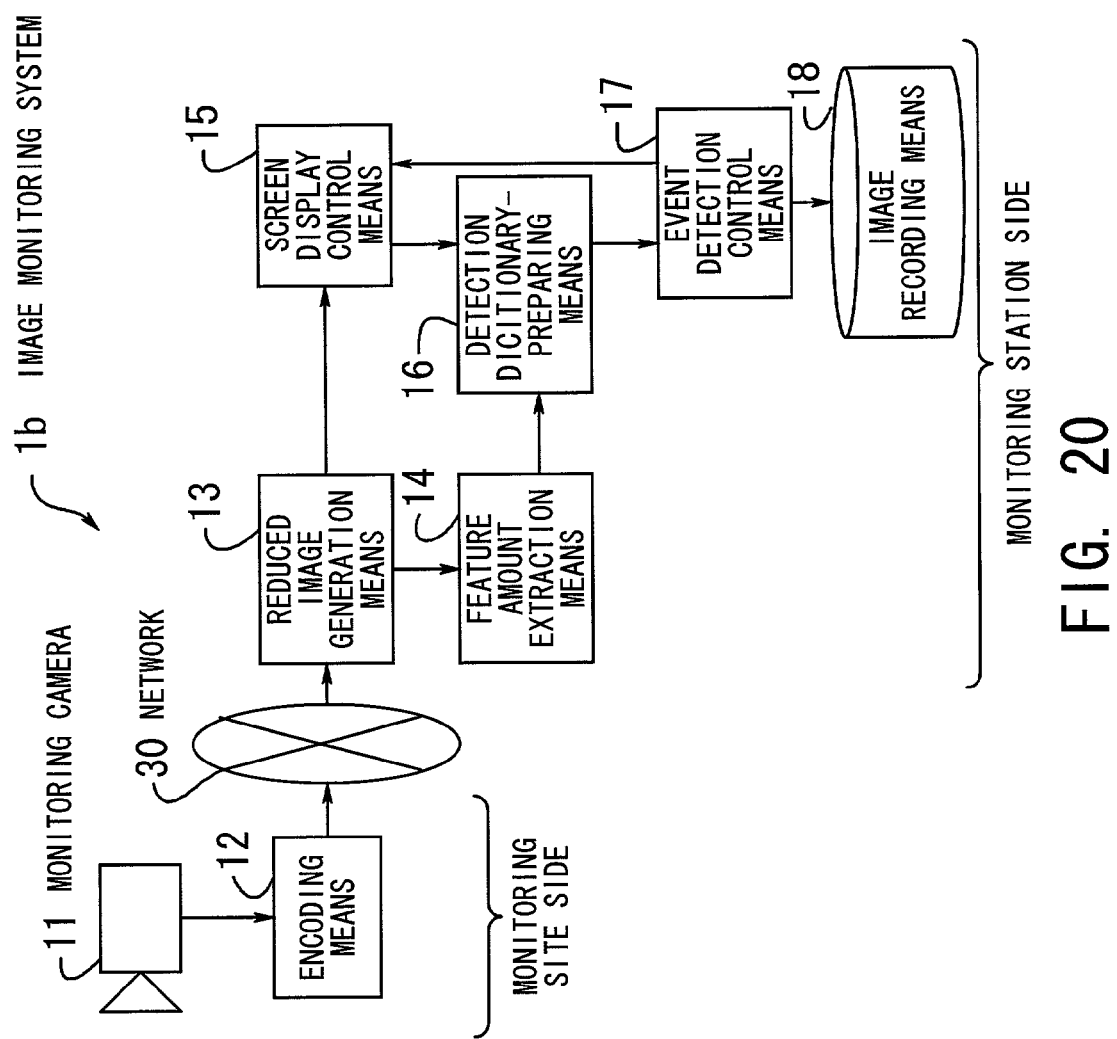
FIG. 20 is a diagram showing the arrangement of an image monitoring system incorporating the image control apparatus.

Next, the description will be given of the arrangement of an image monitoring system employed when the image control apparatus 10 carries out distribution of images via a network. FIGS. 19 and 20 show the arrangements of image monitoring systems both incorporating the image control apparatus 10 applied to a network distribution system.

The image monitoring system 1a is comprised of a monitoring camera 11, an encoding means 12, a reduced image generation means 13, and a feature amount extraction means 14, a bit inserting means 21, all of which are arranged on a monitoring site side, and a separating means 22, a screen display control means 15, a detection dictionary-preparing means 16, an event detection control means 17, and an image recording means 18, all of which are arranged on a monitoring station side.

The bit inserting means 21 inserts a feature amount extracted by the feature amount extraction means 14 into an image signal sent from the reduced image generation means 13 and transmits the resulting image signal via a network 30, and the separating means 22 separates the received signal into an image signal and a feature amount to send the image signal to the screen display control means 15 and the feature amount to the detection dictionary-preparing means 16.

Now, the insertion and extraction of the feature amount will be described. A user data marker (which can be inserted per GOP (about 0.5 seconds), and its bit code is 0x000001B2), which exists in an ordinary bit stream of MPEG1 or MPEG2, is inserted, and in succession thereto, a feature amount obtained from an image formed by simplified decoding is written in the bit stream as an original code.

In this case, it is necessary that a bit sequence to be written in does not contain a sequence of 23 successive bits of 0. This can be attained by limiting each bit sequence of the feature amount vector to 15 bits, and inserting 1 every 16 bits, or by any other suitable method.

Further, the separating means 22 carries out the operation of extracting the feature amount portion from the MPEG coded data sequence by searching the user data marker of 0x000001B2, then dividing data following the user data marker whenever 16 bits are received to take out a predetermined number of feature amounts, and taking out effective less significant 15 bits therefrom.

In the image monitoring system 1b shown in FIG. 20, the monitoring camera 11 and the encoding means 12 are arranged on a monitoring site side. Further, on the monitoring station side connected to the monitoring site side via the network 30, there are arranged the reduced image generation means 13, the feature amount extraction means 14, the screen display control means 15, the detection dictionary-preparing means 16, the event detection control means 17, and the image recording means 18. The arrangement shown in FIG. 20 makes it possible to further lessen load on the apparatus on the monitoring site.

Figure 21:
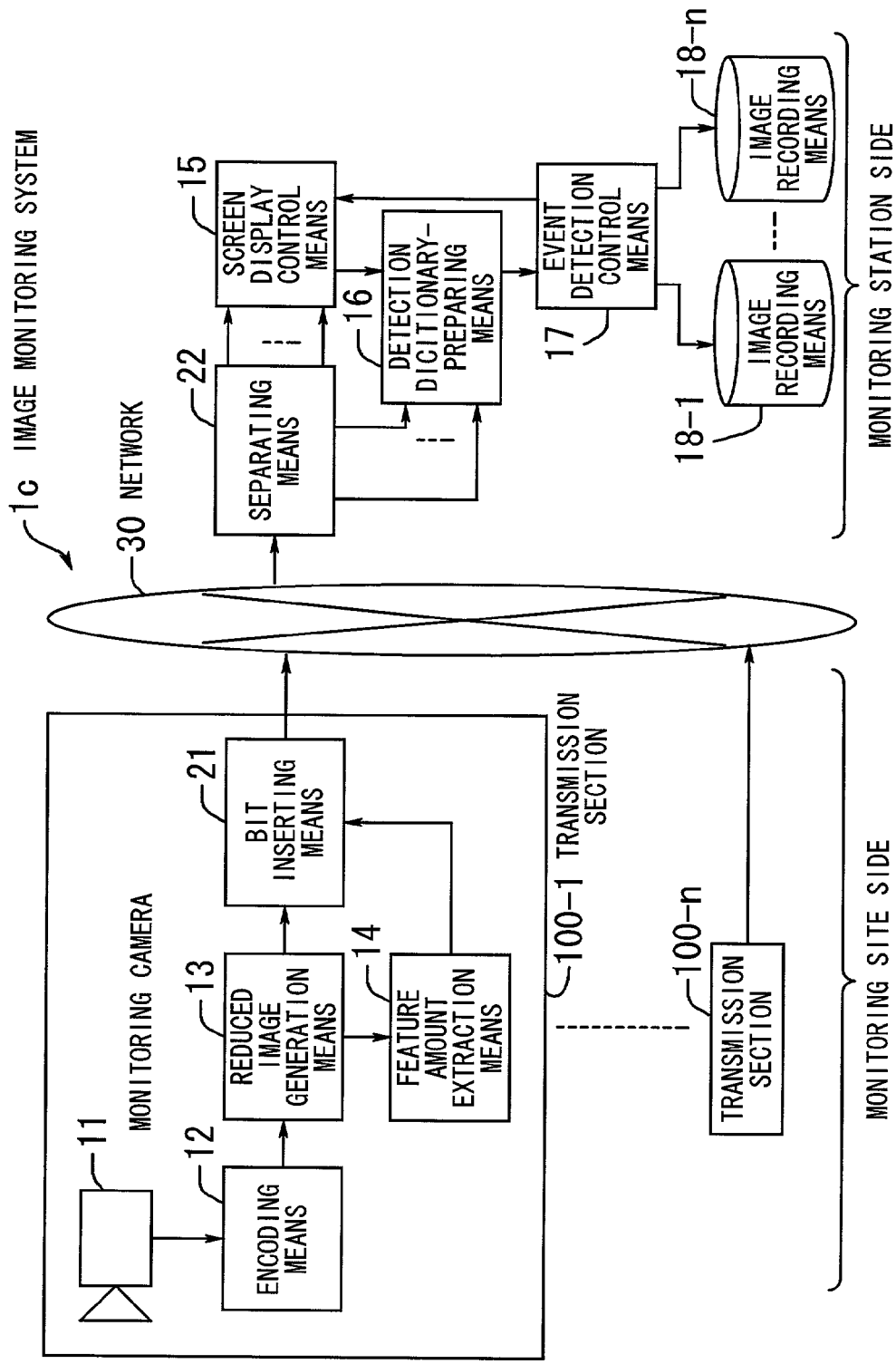
FIG. 21 is a diagram showing the arrangement of an image monitoring system for collectively displaying information transmitted from a plurality of monitoring cameras.

FIG. 21 shows the arrangement of an image monitoring system 1c for collectively displaying information from a plurality of monitoring cameras. The image monitoring system 1c shows a case in which the FIG. 19 arrangement of the image monitoring system 1a is applied to a system for performing a plurality of monitoring operations.

Transmission sections 100-1 to 100-n on an monitoring site side each include the monitoring camera 11, the encoding means 12, the reduced image generation means 13, the feature amount extraction means 14 and the bit inserting means 21. Further, the separating means 22, the screen display control means 15, the detection dictionary-preparing means 16, the event detection control means 17 and image recording means 18-1 to 18-n are arranged on a monitoring station side.

The separating means 22 separates each of signals sent from the transmission sections 100-1 to 100-n into an image signal and a feature amount. Further, the image recording means 18-1 to 18-n each record/store images to be recorded which have been received from the transmission sections 100-1 to 100-n. The screen display control means 15 of the image monitoring system 1c performing such a plurality of monitoring operations displays a selector button for selecting one monitoring site from a plurality of monitoring sites (selecting one of the transmission sections 100-1 to 100-n).

As described above, according to the image control apparatus 10 of the present invention, it is possible to record only the images at the time when an image event occurs, to thereby largely decrease the consumption of a recoding medium when the monitoring is carried out over a long time.

Further, it is possible to store image-extracting feature amounts for image events having occurred in the past, and perform adjustment on the screen to change settings of parameters in real time, to thereby provide an environment enabling detecting situations to be displayed. Therefore, it is possible to enable the user to make use of the image-recording/storing function which is simple in operation and effective, and enhance the quality and reliability of image monitoring control.

As described heretofore, the image control apparatus according to the invention performs simplified decoding of an encoded image to thereby generate a reduced image, and display a listing of static images of the reduced images on the screen. Then, variance values are measured from feature amounts of a detection event designated by the user, a detection dictionary parameter is prepared which contains detection parameters which are feature amounts having small variance values. The distances between feature amounts and the detection dictionary are calculated to determine a detection range. This makes it possible to automatically and accurately set parameters required for detecting an event. Therefore, it is possible to enhance the quality and reliability of the image monitoring control.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An image control apparatus for performing control of image monitoring, comprising:
   encoding means for encoding an image from a monitoring camera;
   reduced image generation means for performing simplified decoding of an encoded image to generate a reduced image;
   feature amount extraction means for detecting an image event from the reduced image and extracting feature amounts therefrom;
   screen display control means for performing screen display control such that a listing of static images of the reduced image is displayed on a display, and a user is allowed to designate any of the static images to thereby set a detection event which is an event to be detected;
   detection dictionary-preparing means for measuring variance values from the feature amounts of the detection event to thereby prepare a detection dictionary containing detection parameters which are feature amounts having small variance values;
   event detection control means for calculating distances between the detection dictionary and the feature amounts to determine a detection range; and
   image-recording means for comparing the distances and a threshold value for recording images, and based on a result of the comparison, recoding monitored images.

2. The image control apparatus according to claim 1, wherein the event detection control means uses THmd as a detection threshold for notifying detection of an event and THms as a detection threshold for storing feature amounts, provided that:

$$THmd = Cthd \cdot Emax$$

$$THms = Cths \cdot Emax$$

where Emax represents a maximum value of a distance between the detection event which is an event to be detected and the detection dictionary, Cthd and Cths represent constants, respectively, and a relationship of 1<Cthd<Cths holds.

3. The image control apparatus according to claim 2, wherein the screen display control means displays a graph indicative of the distance between the detection event and the detection dictionary, and lines indicative of the respective detection thresholds THmd and THms, such that the detection thresholds can be variably set by a user.

4. The image control apparatus according to claim 1, wherein the screen display control means automatically rearranges an order of display of the static images which are designated by a user.

5. The image control apparatus according to claim 1, wherein the detection dictionary-preparing means prepares the detection dictionary by causing the detection parameters to associate with respective weighting coefficients indicative of importance thereof.

6. The image control apparatus according to claim 1, wherein the event detection control means prevents erroneous detection based on the following equation:

$$THmd1 = (Emax + Ea)/2$$

where Ea represents a non-detection distance, and THmd1 represents a new detection threshold, the non-detection distance being defined as a distance between a non-detection event which is an event not to be detected and the detection dictionary, provided that the non-detection event appears in the detection range, and at the same time, distances between the detection events and the detection dictionary being all smaller than the non-detection distance.

7. The image control apparatus according to claim 1, wherein when a new event appears in the detection range and at least one of distances between the detection events and the detection dictionary is larger than a distance between the new event and the detection dictionary, the detection dictionary-preparing means prepares a non-detection dictionary based on the new event, and the event detection control means sets the new event to an event to be detected when Eb<Ec holds, wherein Eb represents a distance between the new event and the detection dictionary and Ec represents a distance between the new event and the non-detection dictionary, and does not set the new event to the event to be detected when Eb>Ec holds.

8. The image control apparatus according to claim 1, wherein the reduced image generation means generates the reduced image having a decreased resolution, at a reduction ratio dependent on the detection event.

9. The image control apparatus according to claim 1, wherein the feature amount extraction means sets parameters determined by analogy from information of preceding and following frames to feature amounts, when conversion from a P picture is switched to an I picture.

* * * * *

UNITED STATES PATENT AND TRADEMARK OFFICE
CERTIFICATE OF CORRECTION

PATENT NO. : 6,996,275 B2 Page 1 of 1
APPLICATION NO. : 10/102816
DATED : February 7, 2006
INVENTOR(S) : Takafumi Edanami It is certified that error appears in the above-identified patent and that said Letters Patent is hereby corrected as shown below:

Title page, Item (56), in the "FOREIGN PATENT DOCUMENTS" section, second reference, change "11/1993" to --1/1993--; and fourth reference, change "200224542 A" to --2000224542 A--.

Signed and Sealed this

Eleventh Day of July, 2006

JON W. DUDAS
*Director of the United States Patent and Trademark Office*